US008406765B2

(12) United States Patent
Gonsa et al.

(10) Patent No.: US 8,406,765 B2
(45) Date of Patent: Mar. 26, 2013

(54) EFFICIENT PROVISION OF A MULTICAST SERVICE BY SWITCHING BETWEEN MULTICAST SERVICES IN A MOBILE COMMUNICATION SYSTEM

(75) Inventors: Osvaldo Gonsa, Langen (DE); Ralf Becker, Langen (DE); Rolf Hakenberg, Langen (DE); Jose Luis Rey, Langen (DE)

(73) Assignee: Panasonic Corporation, Osaka (JP)

( * ) Notice: Subject to any disclaimer, the term of this patent is extended or adjusted under 35 U.S.C. 154(b) by 1274 days.

(21) Appl. No.: 12/159,740

(22) PCT Filed: Jan. 23, 2007

(86) PCT No.: PCT/EP2007/000563
§ 371 (c)(1),
(2), (4) Date: Jul. 28, 2008

(87) PCT Pub. No.: WO2007/101502
PCT Pub. Date: Sep. 13, 2007

(65) Prior Publication Data
US 2009/0005056 A1    Jan. 1, 2009

(30) Foreign Application Priority Data
Mar. 9, 2006 (EP) .................................... 06004868

(51) Int. Cl.
H04W 36/00 (2009.01)
H04W 4/00 (2009.01)
H04M 3/42 (2006.01)
(52) U.S. Cl. ...................... 455/436; 455/414.2; 370/331
(58) Field of Classification Search .................. 455/436, 455/422.1, 550.1, 414.1, 414.2; 370/331
See application file for complete search history.

(56) References Cited

U.S. PATENT DOCUMENTS
| | | | |
|---|---|---|---|
| 7,043,244 B1 * | 5/2006 | Fauconnier | 455/442 |
| 2002/0024956 A1 * | 2/2002 | Keller-Tuberg | 370/395.52 |
| 2004/0131026 A1 * | 7/2004 | Kim et al. | 370/328 |

(Continued)

FOREIGN PATENT DOCUMENTS
| | | |
|---|---|---|
| EP | 0 805 576 | 11/1997 |
| WO | WO 00/60892 | * 10/2000 |

(Continued)

OTHER PUBLICATIONS

International Search Report dated Mar. 9, 2007.

(Continued)

*Primary Examiner* — Christopher M Brandt
(74) *Attorney, Agent, or Firm* — Dickinson Wright PLLC

(57) ABSTRACT

The invention relates to a method for efficiently providing a bidirectional multicast service (e.g. IMS) to a user equipment (105), located in a radio cell, controlled by a control entity (104). For the downlink data of the bidirectional service a downlink multicast service (e.g. MBMS) is utilized. In case the control entity (e.g. RNC) decides for a point-to-point radio link to the UE, the bidirectional service is notified and system resources, established for the bidirectional service are utilized for providing the bidirectional service downlink data. This includes radio resources in the radio access network and may include connections in the core network. Optionally, the downlink multicast service may be de-activated for the specific mobile terminal, but the system resources already established may be maintained. The invention further relates to a network entity in the CN or in the RAN for configuring system resources and for forwarding the multicast service data to the UE.

47 Claims, 7 Drawing Sheets

U.S. PATENT DOCUMENTS

| | | | | |
|---|---|---|---|---|
| 2004/0224698 A1* | 11/2004 | Yi et al. | .................... | 455/450 |
| 2005/0113099 A1* | 5/2005 | Eriksson et al. | .............. | 455/450 |
| 2005/0129058 A1* | 6/2005 | Casaccia et al. | .............. | 370/464 |
| 2005/0243721 A1* | 11/2005 | Cai et al. | ................. | 370/230 |
| 2006/0056341 A1* | 3/2006 | Takagi et al. | ................ | 370/328 |
| 2006/0116152 A1* | 6/2006 | Yahagi | ................... | 455/522 |
| 2006/0229082 A1* | 10/2006 | Terry | ................... | 455/450 |

FOREIGN PATENT DOCUMENTS

| | | |
|---|---|---|
| WO | 2005/081569 | 9/2005 |
| WO | 2005/104591 | 11/2005 |
| WO | 2006/016003 | 2/2006 |
| WO | 2006/026937 | 3/2006 |

OTHER PUBLICATIONS

3GPP Group Services and System Aspects: 1-47, "TR 23.979 V1.1.0:3GPP enablers for OMA PoC Services," 3GPP TR 23.979 V1.1.0, Aug. 2004, page complete, XP002321832, pp. 10,11, p. 13-p. 16, pp. 24,25.

3GPP TSG-SA2 Meeting #50, TDOC S2-060079, Siemens: "23.228 CR,Facilitating 1-47 multicast bearer services in IMS," [Online] Jan. 16, 2006, XP002396145 Budapest, Hungary, Retrieved from the Internet: URL:http://www.3gpp.orgiftp/tsg_sa/WG2_Arc / TSGS2_50_Budapest/Docsh [retrieved on Aug. 22, 2006] the whole document.

ETSI Standards, European 34-37,46 Telecommunications Standards Institute: "Digital cellular telecommunications system (Phase 2+); Universal Mobile Telecommunications System (UMTS); Conferencing using the IP Multimedia (IM) Core Network (CN) subsystem; Stage 3," ETSI TS 124 147 V6.3.0, vol. 3-CNI;3-CT1, No. V630, Jun. 2005, XP014030516 Sophia-Antipo, FR ISSN: 0000-0001 paragraphs[0004], [6.3.2].

3GPP TSG-SA WG2 #48, S2-052223, Alcatel Shanghai Bell: "Enable IMS service with multicast capability," [Online] Sep. 5, 2005, XP002396146 Sophia Antipolis, France Retrieved from the Internet: URL:http://www.3gpp.org/ftp/tsg_sa/WG2_Arch/ TSGS2_48_Sophia_Antipolls/Docs/> [retrieved on Aug. 22, 2006].

3GPP TSG SA WG2 #49, S2-052574, Siemens China Mobile: "Discussion Paper on IMS over multicast bearer services," [online] Nov. 2005, XP002396148 Yokosuka Japan.

\* cited by examiner

EFFICIENT PROVISION OF A MULTICAST SERVICE BY SWITCHING BETWEEN MULTICAST SERVICES IN A MOBILE COMMUNICATION SYSTEM

FIELD OF THE INVENTION

The invention relates to a method for providing a bidirectional multicast service in a mobile communication system. The invention further relates to a method for changing system resources for a bidirectional multicast service within a mobile communication system. The invention also relates to a method for setting up a downlink multicast service. The invention further relates to a network entity in the core network or in the radio access network for configuring system resources in the mobile communication system and for forwarding the multicast service data to the mobile terminal. The invention also relates to a mobile terminal for receiving the bidirectional multicast service.

TECHNICAL BACKGROUND

Mobile communication systems, such as the universal mobile telecommunications system (UMTS) can carry both voice and data traffic via fixed, wireless and satellite networks. These communication systems are incessantly evolving, thereby also developing and providing packet frameworks for the delivery of IP based, real-time, conversational or multimedia services. For instance, an IP multimedia subsystem (IMS) standard is specified by the 3rd Generation Partnership Project (3GPP) (see 3GPP TS 23.228 v6.9.0: "IP Multimedia Subsystem (IMS); Stage 2 (Release 6)", incorporated herein by reference, available from http://www.3gpp.org). IMS is specifically architected to enable and enhance real time, mobile and fixed multimedia mobile services such as rich voices services, video telephony, messaging, conferencing and push services. IMS runs over the standard Internet Protocol (IP) and supports both packet-switched and circuit-switched phone systems.

Typically, multiple users are subscribed to receive IMS services, such as Push to Talk over Cellular (PoC) or Video-conferencing services, which occasionally includes providing the same data to multiple users in a specific cell of a radio network. IMS standards however only support point-to-point (PTP) connections to the mobile terminals (MT) of the users, including the reservation of system resources in the radio access network (RAN) for dedicated radio bearer connectivity to each mobile terminal provided with the service.

In cases where multiple users receive the same service, it can be advantageous to use a multicast capable service with a point-to-multipoint (PTM) capability to transmit the service data to the multiple users. When providing IMS services in an UMTS system, typically, shared or broadcast radio bearers instead of many dedicated radio bearers are utilized to serve multiple users in a radio cell, which may save system resources in the radio access network.

A multicast capable service is for example the Multimedia Broadcast/Multicast Service (MBMS), which has also been standardized by the 3GPP (see 3GPP TS 23.246 v6.6.0: "Multimedia Broadcast/Multicast Service (MBMS); Architecture and functional description (Release 6)", incorporated herein by reference, available from http://www.3gpp.org). The MBMS service is a downlink multicast service for transmitting the same downlink data to a plurality of recipients through a radio network. The recipients typically share one radio channel, a shared radio bearer for the reception of MBMS service data. The MBMS service supports the transmission of multimedia data such as real-time image and voice or text. It may therefore also be used to provide data of IMS services to the users. As the same data is transmitted to many users probably located in different cells, the type of connection, PTP or PTM, used in a cell for a specific mobile terminal of the user may be based on the number of users located in each cell.

In the following, an exemplary setup procedure for such an IMS service using the MBMS service framework for downlink data provision as described in 3GPP TSG-SA WG2 #48, S2-052305, Sophia Antipolis, France 5-9 Sep. 2005, "Enable IMS service with multicast capability" (incorporated herein by reference, available at http://www.3gpp.org/ftp/tsg_sa/WG2_Arch/TSGS2__48_Sophia_Antipolis/Docs/) is briefly discussed.

First, the user subscribes to an IMS service by sending an INVITE message to the service provider via the radio access network and the core network. After authorizing the user to receive the service, the service provider initiates the reservation of system resources in the mobile communication system, including the setting up of tunnels between a Gateway GPRS support node (GGSN)—Service GPRS support node (SGSN) and a radio network controller (RNC), for controlling radio transmission resources in the RAN. Furthermore, a radio bearer between the RNC and the user equipment (UE) is established for the signalling and the uplink connection from the UE to the service provider. For communicating, session setup signalling, session setup and control protocols as SIP (Session Initiation Protocol) are used.

To provide the downlink data to the users, the MBMS service framework is utilized. The setup procedure of the MBMS service can be initiated for example by the IMS service provider. The MBMS setup also includes the configuration of system resources for the transmission of the downlink IMS data. Accordingly, this setup typically comprises the establishment of tunnels between GGSN, SGSN and RNC, described by contexts established in the respective network nodes and further comprises the setup of a shared or dedicated radio bearer in the RAN, depending on the users located in the cell to receive the IMS service.

SUMMARY OF THE INVENTION

The object of the invention is to enable an efficient provision of a bidirectional multicast service using a downlink multicast service for provision of downlink service data of the bidirectional multicast service.

The object is solved by the subject matter of the independent claims. Advantageous embodiments of the invention are subject-matters of the dependent claims.

One aspect of the invention is to reuse already established system resources for downlink service data transmission. During setup procedure a radio bearer is established for the bidirectional multicast service first. In case downlink service data is to be provided via a PTP connection to a mobile terminal, the already established radio bearer is used to deliver the downlink multicast service data, instead of allocating additional system resources for the downlink multicast service for downlink data transmission. Only in case a PTM connection has been decided, an additional shared bearer is established for the downlink multicast service. If a shared bearer is already available in the radio cell, this shared radio bearer is utilized for providing the service data to the mobile terminal.

An embodiment of the invention relates to a method for providing a bidirectional multicast service from a bidirectional multicast service provider to a mobile terminal within a mobile communication system. The mobile communication system comprises a core network and a radio access network. According to the method, system resources are configured for the bidirectional multicast service in the mobile communication system, in order to transmit multicast service data of the bidirectional multicast service.

The configuration comprises the establishment of a bidirectional radio bearer between the mobile terminal and a control entity, which controls radio resources of the radio access network. Furthermore, system resources are configured for a downlink multicast service in the core network to transmit downlink multicast service data of the bidirectional multicast service via the downlink multicast service. In addition, it is decided whether to utilize a point-to-point connection or a point-to-multipoint connection in the radio access network for providing the downlink multicast service data of the bidirectional multicast service to the mobile terminal. In case it has been decided to utilize a point-to-point connection, the system resources established for the bidirectional multicast service are utilized to provide the downlink multicast service data to the mobile terminal. On the other hand, in case it has been decided to utilize a point-to-multipoint connection, the system resources of the core network established for the downlink multicast service are utilized for transport of the downlink multicast service data in the core network. Furthermore, a shared radio bearer is established or an already established shared radio bearer is utilized in the radio access network for providing the downlink multicast service data to the mobile terminal.

In another embodiment of the invention the configuration of system resources for the bidirectional multicast service further includes the establishment of a connection between a network entity in the core network and the control entity in the radio access network. In case it has been decided to utilize a point-to-point connection, said connection between the network entity in the core network and the control entity in the radio access network is utilized for the transmission of the downlink multicast service data. This includes a reuse of connections in the core network, which results in a more efficient provision of the bidirectional multicast service.

According to a variation of this embodiment, the multicast service data includes uplink multicast service data and downlink multicast service data. In case it has been decided to utilize a point-to-multipoint connection, the uplink multicast service data is transported utilizing the system resources configured for the bidirectional multicast service. Furthermore, the downlink multicast service data is transported utilizing the system resources configured for the downlink multicast service.

According to another variation of this embodiment, the multicast service data includes uplink multicast service data and downlink multicast service data. In case it has been decided to utilize a point-to-point connection, the uplink multicast service data and the downlink multicast service data are transported utilizing the system resources configured for the bidirectional multicast service.

Still in another embodiment of the invention the configuration of the system resources in the core network for the downlink multicast service includes an activation of the system resources in the core network. In addition, in case it has been decided to utilize a point-to-point connection, the downlink multicast service is de-activated for the mobile terminal utilizing the point-to-point connection, which includes releasing the system resources in the core network, configured for the downlink multicast service. Thereby, the released system resources are available for other connections and users.

According to an additional embodiment, the configuration of the system resources in the core network for the downlink multicast service includes an activation of the system resources. In case it has been decided to utilize a point-to-point connection, the downlink multicast service is de-activated for the mobile terminal utilizing the point-to-point connection, which includes maintaining the system resources in the core network, configured for the downlink multicast service. By maintaining the system resources, a possible future configuration of the MBMS service for the mobile terminal is accelerated.

In a further embodiment the downlink multicast service data is being provided via a point-to-point connection to the mobile terminal. The system resources are maintained in the core network configured for the downlink multicast service, which includes the step of de-activating the system resources. In case it is to be decided to utilize a point-to-multipoint connection, the maintained system resources in the core network may be re-activated for transmitting the downlink multicast service data in the core network via the downlink multicast service.

According to another embodiment of the invention, the downlink multicast service is provided from a downlink multicast service provider. Furthermore, the de-activation of the downlink multicast service includes a notification to the downlink multicast service provider, the control entity in the radio access network, the network entity and the mobile terminal in order to de-activate the downlink multicast service for the mobile terminal.

In an advantageous embodiment the notification messages for deactivating the downlink multicast service originate from a network entity in the core network or the control entity in the radio access network or the mobile terminal or the downlink multicast service provider.

Another embodiment of the invention uses a multicast service identifier assigned to the bidirectional multicast service. This identifier may enable an identification of the multicast service amongst other multimedia services.

According to an additional embodiment of the invention, the multicast service identifier is an Access Point Name or an IP multicast address. Using the access point name and the IP multicast address of the multicast service as the multicast service identifier may have the advantage that they are typically available throughout the entities in the mobile communication system.

In a variation of the embodiment of the invention the configuration of system resources for the multicast service data of the bidirectional multicast service further includes activating a context for multicast service related control signaling and for multicast service data transfer at least in a network entity of the core network. The context may include routing information on the routing of the multicast service data in the configured system resources to provide the multicast service from the multicast service provider to the mobile terminal. The context may also include a multicast service identifier that identifies the bidirectional multicast service.

According to another embodiment of the invention, the configuration of system resources for the data of the bidirectional multicast service further includes activating a control signaling context for multicast service related control signaling comprising routing information on the routing of control signaling in the configured system resources and including a multicast service identifier. A data context for multicast service data transfer may include routing information on the routing of multicast service data provided from the multicast service provider to the mobile terminal in the configured system resources, which are being identified by a resource identifier. The data context may further include a multicast service identifier at least in a network entity of the core network.

In a further embodiment of the invention the configuration of the system resources for the downlink service data includes activating a mobile terminal related context of the downlink multicast service at least in a network entity of the core network. The mobile terminal related context may include information on the downlink multicast services the mobile terminal is registered to. Further, it may optionally include information on the mobile terminal.

According to an embodiment of the invention, the contexts activated for the downlink multicast service are maintained in case it has been decided to use a point-to-point connection in the radio access network. An advantage may be that the maintained context may be reactivated in a fast way.

In a variation of an embodiment the downlink multicast service data is being provided to the mobile terminal via a point-to-point connection in the radio access network, which is configured for the bidirectional multicast service. In case it is to be decided to utilize a point-to-multipoint connection, the maintained contexts, that were activated for the downlink multicast service for transporting the downlink multicast service data in the core network via the downlink multicast service are utilized.

According to a further embodiment of the invention, the contexts activated for the downlink multicast service are deleted in case it has been decided to use a point-to-point connection in the radio access network. The system resources, defined by the contexts are thereby released and are available for other uses.

Still in another embodiment the mobile terminal, which is provided with the bidirectional multicast service and uses the downlink multicast service for transmitting the downlink multicast service data is identified by comparing the multicast service identifiers, that are comprised in the control signaling context and the mobile terminal related context.

A variation of an embodiment of the invention includes that the multicast service identifier is unique to a bidirectional multicast service, which utilizes the downlink multicast service for providing the downlink multicast service data of the bidirectional multicast service. By defining a unique multicast service identifier, specifically for the bidirectional multicast service over the downlink multicast service framework, no comparison is necessary to identify the bidirectional multicast service.

According to a further embodiment, the mobile terminal, which is provided with the bidirectional multicast service and receives the downlink multicast service data of the bidirectional multicast service utilizing the downlink multicast service, is identified by means of the unique multicast service identifier.

A further embodiment identifies the mobile terminal by a network entity of the core network or the control entity of the radio access network.

In another embodiment of the invention the decision whether to utilize a point-to-point connection or a point-to-multipoint connection is made by the control entity. In addition, the control entity for controlling the radio resources of the radio access network is informed by a network entity in the core network on the mobile terminal having requested the bidirectional multicast service. Subsequently, a notification message is transmitted to the network entity in the core network to inform the network entity on the decision to utilize the point-to-point connection. The notification message comprises information on the mobile terminal to be utilizing the point-to-point connection and information on the multicast service.

According to an additional embodiment, the network entity is a gateway GPRS support node or a serving GPRS support node in the core network.

An advantageous embodiment identifies the bidirectional multicast service by a multicast service identifier. Furthermore, an activation message is transmitted from the mobile terminal to a downlink multicast service provider for activating the downlink multicast service to be used for the transmission of downlink multicast service data.

In a further embodiment, the mobile terminal may be authorized by the downlink multicast service provider to receive the downlink multicast service data. If authorization is successful, a network entity of the core network receives a notification including the multicast service identifier of the bidirectional multicast service.

According to an advantageous embodiment of the invention, the mobile terminal is located in a source cell. Furthermore, the bidirectional multicast service is provided to further mobile terminals within the mobile communication system, located in a target cell. System resources are configured in the target cell for providing multicast service data of the bidirectional multicast service to the further mobile terminals. In addition, the system resources configured for the further mobile terminals of the target cell are utilized for providing the bidirectional multicast service to the mobile terminal. The system resources, configured for the mobile terminal in the source cell are released, when handing over the mobile terminal from the source cell to the target cell.

In an additional embodiment of the invention the configured system resources in the target cell include an established point-to-multipoint connection between a control entity of the radio access network and the further mobile terminals. The configured system resources in the target cell are utilized, which comprises transmitting the downlink multicast service data to the mobile terminal via the established point-to-multipoint connection for the further mobile terminals. Furthermore, the control entity of the radio access network is notified in order to release the bidirectional radio bearer, which is configured for the bidirectional multicast service for the mobile terminal in the source cell.

For a further embodiment the configured system resources in the target cell include an established connection between a network entity of the core network and the control entity of the radio access network. Additionally, the configured system resources include a point-to-multipoint connection between the control entity of the radio access network and the further mobile terminals. Furthermore, the utilization of the configured system resources in the target cell comprises transmitting the downlink multicast service data to the mobile terminal utilizing said established connection and said established point-to-multipoint connection for the further mobile terminals. The network entity of the core network is notified to release a configured connection between the network entity and the control entity for the mobile terminal in the source cell. The control entity of the radio access network is further notified to release the bidirectional radio bearer configured for the bidirectional multicast service for the mobile terminal in the source cell.

According to the invention, a method for changing system resources for providing a bidirectional multicast service from a multicast service provider to a mobile terminal within a mobile communication system is presented. The mobile communication system comprises a core network and a radio access network. The method comprises the provision of uplink multicast service data of the bidirectional multicast service from the mobile terminal utilizing established system resources configured for the bidirectional multicast service. The established system resources configured for the bidirectional multicast service include a bidirectional radio bearer between a control entity for controlling radio resources in the radio access network and the mobile terminal.

Furthermore, the downlink multicast service data of the bidirectional multicast service is provided to the mobile terminal utilizing system resources configured for a downlink multicast service. Said system resources, configured for the downlink multicast service include a point-to-multipoint connection in the radio access network. Additionally, it is decided whether to use a point-to-point connection in the radio access network for providing the downlink multicast service data to the mobile terminal instead of the established point-to-multipoint connection. In case it has been decided to utilize a point-to-point connection, the established system resources configured for the bidirectional multicast service are utilized for providing the downlink multicast service data to the mobile terminal.

In a variation of the invention the point-to-multipoint connection comprises a shared radio bearer between the control entity and the mobile terminal.

According to an embodiment, in case it has been decided to utilize a point-to-point connection, the system resources, configured for the downlink multicast service are released, including the shared radio bearer.

In another embodiment of the invention the system resources, configured for the downlink multicast service include at least one connection between entities in the core network and the radio access network. Furthermore, in case it has been decided to utilize a point-to-point connection, said at least one connection are maintained and the shared radio bearer, configured for the downlink multicast service is released.

According to an advantageous embodiment, the downlink multicast service is activated and in case it has been decided to utilize a point-to-point connection, the downlink multicast service is de-activated.

The invention further relates to a method for changing system resources for providing a bidirectional multicast service from a multicast service provider to a mobile terminal within a mobile communication system. The mobile communication system comprises a core network and a radio access network. Uplink multicast service data and downlink multicast service data of the bidirectional multicast service is exchanged between the multicast service provider and the mobile terminal, thereby utilizing established system resources, which were configured for the bidirectional multicast service. The system resources configured for the bidirectional multicast service include a point-to-point connection in the radio access network.

Furthermore, it is decided, whether to use point-to-multipoint connection in the radio access network for providing the downlink multicast service data to the mobile terminal instead of the established point-to-point connection. In case it has been decided to utilize a point-to-multipoint connection, system resources in the core network are configured for a downlink multicast service for transporting the downlink multicast service data in the core network. In addition, a shared radio bearer is established in the radio access network for providing the downlink multicast service data from the control entity to the mobile terminal.

In a variation of the invention the point-to-point connection includes a bidirectional radio bearer between the control entity and the mobile terminal.

According to an embodiment of the invention, in case it has been decided to utilize a point-to-multipoint connection, the downlink multicast service is activated for transporting the downlink multicast service data.

In a further embodiment in case it has been decided to utilize a point-to-multipoint connection, the configuration of system resources in the core network for the downlink multicast service includes utilizing established system resources in the core network.

The invention further provides a method for setting up a downlink multicast service for transmitting downlink multicast service data from a downlink multicast service provider to a mobile terminal within a mobile communication system. The mobile communication system comprises a core network and a radio access network. The downlink multicast service is to be used in response to a notification from a bidirectional multicast service, in order to provide downlink multicast service data of the bidirectional multicast service to the mobile terminal. Furthermore, it is checked whether system resources in the core network are present, said system resources being pre-configured for the bidirectional multicast service. In case said system resources in the core network are present, the pre-configured system resources in the core network are utilized for transporting the downlink multicast service data in the core network.

In case said system resources in the core network are not present, system resources in the core network are configured for transporting the downlink multicast service data of the bidirectional multicast service in the core network. It is further decided, whether to use a point-to-point connection or a point-to-multipoint connection in the radio access network for providing the downlink multicast service data to the mobile terminal. In case it has been decided to use a point-to-point connection, the set-up procedure is stopped and the configured system resources in the core network are maintained. In case it has been decided to use a point-to-multipoint connection, a shared radio bearer is established or an established shared radio bearer is used in the radio access network for providing the downlink multicast service data to the mobile terminal.

The invention also relates to a method for providing a bidirectional multicast service from a multicast service provider to a mobile terminal within a mobile communication system. The mobile communication system comprises a core network and a radio access network. System resources are configured for the bidirectional multicast service in the mobile communication system for the transmission of multicast service data of the bidirectional multicast service. The configuration comprises the establishment of a bidirectional radio bearer between the mobile terminal and a control entity, which controls radio resources of the radio access network. Further, it is decided whether to utilize a point-to-point connection or a point-to-multipoint connection in the radio access network for providing the downlink multicast service data of the bidirectional multicast service to the mobile terminal. In case it has been decided to utilize a point-to-point connection, the system resources established for the bidirectional multicast service are utilized to provide the downlink multicast service data to the mobile terminal. In case it has been decided to utilize a point-to-multipoint connection, system resources are configured for a downlink multicast service in the core network for the transmission of downlink multicast service data of the bidirectional multicast service via the downlink multicast service. Additionally, a shared radio bearer is established or an established shared radio bearer is used in the radio access network for providing the downlink multicast service data to the mobile terminal.

According to the invention, a method for setting up a downlink multicast service is provided. The setting up is initiated by a bidirectional multicast service, which transmits downlink data of the bidirectional multicast service to a downlink multicast service provider in order to transmit the downlink data of the bidirectional multicast service from the downlink multicast service provider to mobile terminals within a mobile communication system. The mobile communication system comprises a core network and a radio access network.

The downlink multicast service receives from the bidirectional multicast service a notification comprising information about the mobile terminals. Said mobile terminals are registered to the bidirectional multicast service and said mobile terminals destined to receive the downlink data of the bidirectional multicast service utilizing the downlink multicast service. The mobile terminals are registered to the downlink multicast service. System resources in the core network are configured for the downlink multicast service for each mobile terminal of said mobile terminals, receiving the bidirectional multicast service.

The invention further relates to a network entity for configuring system resources, said network entity being part of a radio access network in a mobile communication system. The downlink multicast service data of a bidirectional multicast service is to be provided to the mobile terminal utilizing a downlink multicast service. The network entity includes a processor to configure system resources of the mobile communication system for the bidirectional multicast service for transporting multicasts service data from a multicast service provider to a mobile terminal. The configuration comprises the establishment of a bidirectional radio bearer between the mobile terminal and a control entity, which controls radio resources of the radio access network.

The processor is further adapted to decide whether to utilize a point-to-point connection or a point-to-multipoint connection on the radio access network for providing the downlink multicast service data of the bidirectional multicast service to the mobile terminal. Further included is a receiver to receive downlink multicast service data. A transmitter forwards the received downlink multicast service data through the established bidirectional radio bearer, in case it has been decided to utilize the point-to-point connection. In case it has been decided to utilize the point-to-multipoint connection the received downlink multicast service data is forwarded through an established shared radio bearer to the mobile terminal.

A network entity for configuring system resources is provided by the invention, said network entity being part of the radio access network in a mobile communication system. A bidirectional multicast service is to be provided to a mobile terminal and downlink multicast service data of said bidirectional multicast service is to be transmitted to the mobile terminal utilizing a downlink multicast service. The network entity includes a processor to configure system resources of the mobile communication system for the transmission of multicast service data of the bidirectional multicast service. The configuration comprises the establishment of a bidirectional radio bearer to the mobile terminal. A receiver receives a notification from a network entity of a core network in the mobile communication system, including information on the mobile terminal that is provided with the bidirectional multicast service utilizing the downlink multicast service for transmitting the downlink multicast service data.

The processor is further adapted to decide whether to utilize a point-to-point connection or a point-to-multipoint connection on the radio access network for providing the downlink multicast service data to the mobile terminal. A transmitter is included to transmit a notification to the network entity of the core network, the notification message comprising an identification of the mobile terminal, which is to be utilizing the point-to-point connection and an identification of the bidirectional multicast service. A receiver receives the downlink multicast service data. A transmitter to forward the received downlink multicast service data through the established bidirectional radio bearer configured for the bidirectional multicast service, in case it has been decided to utilize a point-to-point connection. In case it has been decided to utilize a point-to-multipoint connection the received downlink multicast service data is forwarded through an established shared radio bearer to the mobile terminal.

The invention further relates to a mobile terminal within a mobile communication system for participating in a bidirectional multicast service provided by a bidirectional multicast service provider. In the mobile communication system downlink multicast service data of said bidirectional multicast service is to be provided to the mobile terminal utilizing a downlink multicast service. The mobile terminal comprises a processor adapted to configure system resources in the mobile communication system, including a bidirectional radio bearer to a control entity in the radio access network for the transmission and reception of service data of the bidirectional multicast service.

The processor is further adapted to configure system resources in the mobile communication system for the reception of downlink multicast service data through the downlink multicast service. Downlink multicast service data is received through the established bidirectional radio bearer, in case a point-to-point connection is decided in the radio access network. In case a point-to-multipoint connection is decided, downlink multicast service data is received through an established shared radio bearer.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
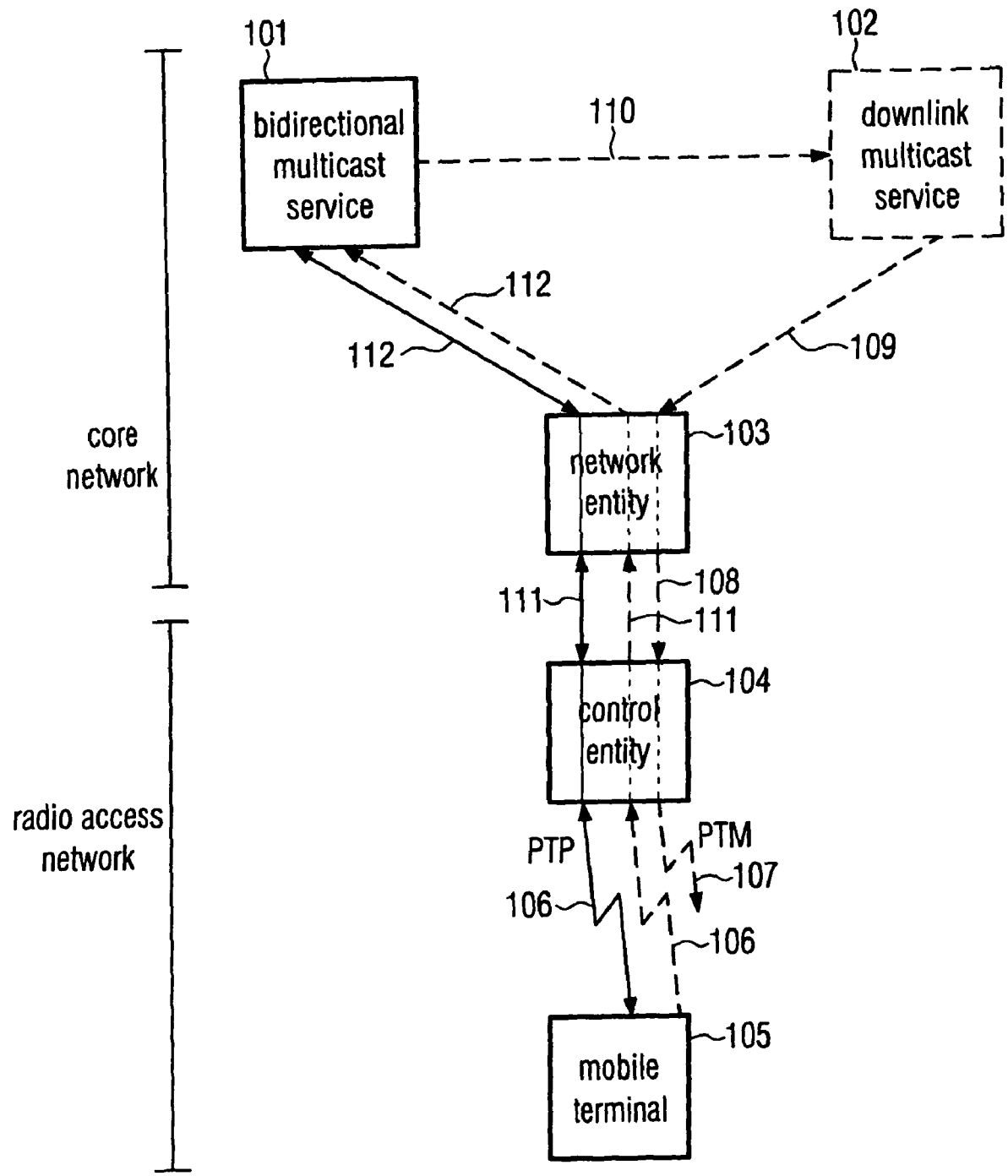
FIG. 1 shows a mobile communication system according to one embodiment of the invention.

The following paragraphs will describe various embodiments of the invention. For exemplary purposes only, most of the embodiments are outlined in relation to an UMTS communication system and the terminology used in the subsequent sections mainly relates to the UMTS terminology. However, the terminology and the description of the embodiments with respect to an UMTS architecture is not intended to limit the principles and ideas of the inventions to such systems.

Also the detailed explanations given in the Technical Background section above are merely intended to better understand the mostly UMTS specific exemplary embodiments described in the following and should not be understood as limiting the invention to the described specific implementations of processes and functions in the mobile communication network.

According to the invention, a radio bearer may be defined as a logical connection between a control entity in the radio access network and one or a plurality of user terminals. Furthermore, the radio bearer may be dedicated, in which case a point-to-point (PTP) connection is established to the one user terminal. Alternatively, the radio bearer may be a point-to-multipoint (PTM) connection, wherein the radio bearer may be shared by a plurality of user terminals in the same radio cell.

A context may be defined as a set of information, which is established in the network nodes of the communication system for the purpose of defining system resources, which are to be used for the transmission of service data. A network entity may be defined as an entity of the core network in a mobile communication system which serves as an entry point for the service data from a service provider and forwards the service data to further entities in the mobile communication system. For example, in a standard UMTS implementation a network entity could be a Gateway GPRS support node (GGSN) or a Service GPRS support node (SGSN). Moreover, according to other implementations a network entity could be a gateway.

Moreover, a control entity may be defined as an entity of the radio access network in the mobile communication system, which controls radio resources in the radio access network. In a typical UMTS implementation the control entity could be a Radio Network Controller (RNC) or a Node B. The control entity is typically responsible for setting up radio bearers to the mobile terminals under its control.

The configuration of system resources in the mobile communication system may be defined as the establishment of necessary connections between the user terminal and the service provider. In the radio access network a radio bearer is configured and subsequently, the necessary resources of the RAN are explicitly reserved for this radio bearer. In the control network the configuration of system resources may include connections between the network entities of the core network and the control entity of the RAN. In a typical UMTS implementation the configured system resources in the core network may comprise tunnels between the SGSN and the GGSN and between the SGSN and the RNC. During the configuration of tunnels in the core network, system resources may or may not be explicitly reserved for the particular tunnels.

FIG. 1 shows a mobile communication system according to one embodiment of the invention. A service provider 101 provides a bidirectional multicast service to a mobile terminal 105 via a network entity 103 and a control entity 104. The bidirectional multicast service is defined by providing service data to multiple user equipments and further receive data from the user equipments, registered to the bidirectional multicast service. The network entity 103 is part of the core network of a mobile communication system. The control entity 104 is part of the radio access network (RAN) of a mobile communication system and controls the radio resources in the RAN.

At first, system resources are configured for the transmission of service data for the bidirectional multicast service, which comprises the establishment of a bidirectional radio bearer 106 between the control entity 104 and the UE 105. For the transmission of downlink service data of the bidirectional multicast service to the mobile terminal 105 a downlink multicast service 102 may be utilized. In order to use the downlink multicast service for downlink data provision, system resources in the core network are configured, including a connection 108 between the network entity 103 and the control entity 104, a connection 109 between the downlink multicast service 102 and the network entity 103 and a connection 110 between the bidirectional multicast service 101 and the downlink multicast service 102.

The subsequent configuration of the downlink multicast service and the bidirectional multicast service depends on the decision of the control entity 104, whether to use a PTP or PTM connection to the UE 105 for the downlink data provision. According to the embodiment of the invention, in case the control entity 104 decides for a PTP connection, the system resources established for the bidirectional service are utilized for providing the downlink multicast service data to the mobile terminal 105, which includes the established bidirectional radio bearer 106. Instead of using the downlink multicast service 102, the bidirectional multicast service 101 is utilized to send the downlink multicast service data to the UE 105. In FIG. 1 this PTP connectivity is depicted by the solid, continuous lines.

On the other hand, if the control entity 104 decides for a PTM connection to the mobile terminal, the setup of the downlink multicast service is resumed and the downlink multicast service data is transmitted via the established resources 110, 109, 108 of the downlink multicast service. Furthermore, said downlink multicast service data is transmitted via a shared radio bearer. If a shared radio bearer 107 is present and available, said already established shared radio bearer is utilized for providing the downlink multicast service data. In case no shared radio bearer is present and available, a new shared radio bearer 107 is configured and the necessary radio resources are reserved for providing the downlink multicast service data to the mobile terminal 105. This PTM connectivity is depicted by the dashed lines. Actually, the dedicated radio bearer 106 depicted by a dashed line is the same radio bearer 106, which is established for the bidirectional multicast service and depicted with the continuous line. This radio bearer 106 is disassembled only for descriptive reasons, namely for separating the two cases PTP or PTM. But in fact, said two radio bearers 106 are identical, though the usage is different.

Accordingly, this also applies to the connections 111 and 112, which are respectively depicted by solid and dashed lines. Though represented as separate connections, actually these are the same, only separated for descriptive purposes, namely to distinguish said two cases, PTP and PTM.

The different usages are illustrated by the arrowheads of the respective connections. For example, the connection 106 is used differently based on the decision between PTP and PTM.

In PTP mode (solid lines) the dedicated radio bearer 106 is utilized in both directions, uplink and downlink. Hence, according to the embodiment of the invention, if a PTP connection has been decided by the control entity 104 only one radio bearer is used for the exchange of service data between the one mobile terminal 105 and the control entity 104 to forward the data to the bidirectional multicast service provider 101.

In PTM mode (dashed lines) the dedicated radio bearer 106 is mainly used for uplink transmissions. The shared radio bearer 107 is used for transmitting downlink multicast service data. Therefore, if a PTM connection has been decided by the control entity 104, two radio bearers are used for the exchange of service data.

In other words, if a PTP connectivity to the mobile terminal is decided for the downlink multicast service, both uplink and downlink multicast service data is transmitted via the bidirectional multicast service and its established system resources, including the dedicated radio bearer 106.

If a PTM connectivity to the mobile terminal is decided for the downlink multicast service, the uplink multicast service data is transmitted to the bidirectional multicast service 101 utilizing the system resources established for the bidirectional service, including the dedicated radio bearer 106. However, the downlink multicast service data is provided to the mobile terminal 105 via the system resources established for the downlink multicast service 102, including the shared radio bearer 107. According to the above, two data paths are defined from the bidirectional multicast service provider 101 to the mobile terminal 105, one for uplink data and one for downlink data.

Figure 6:
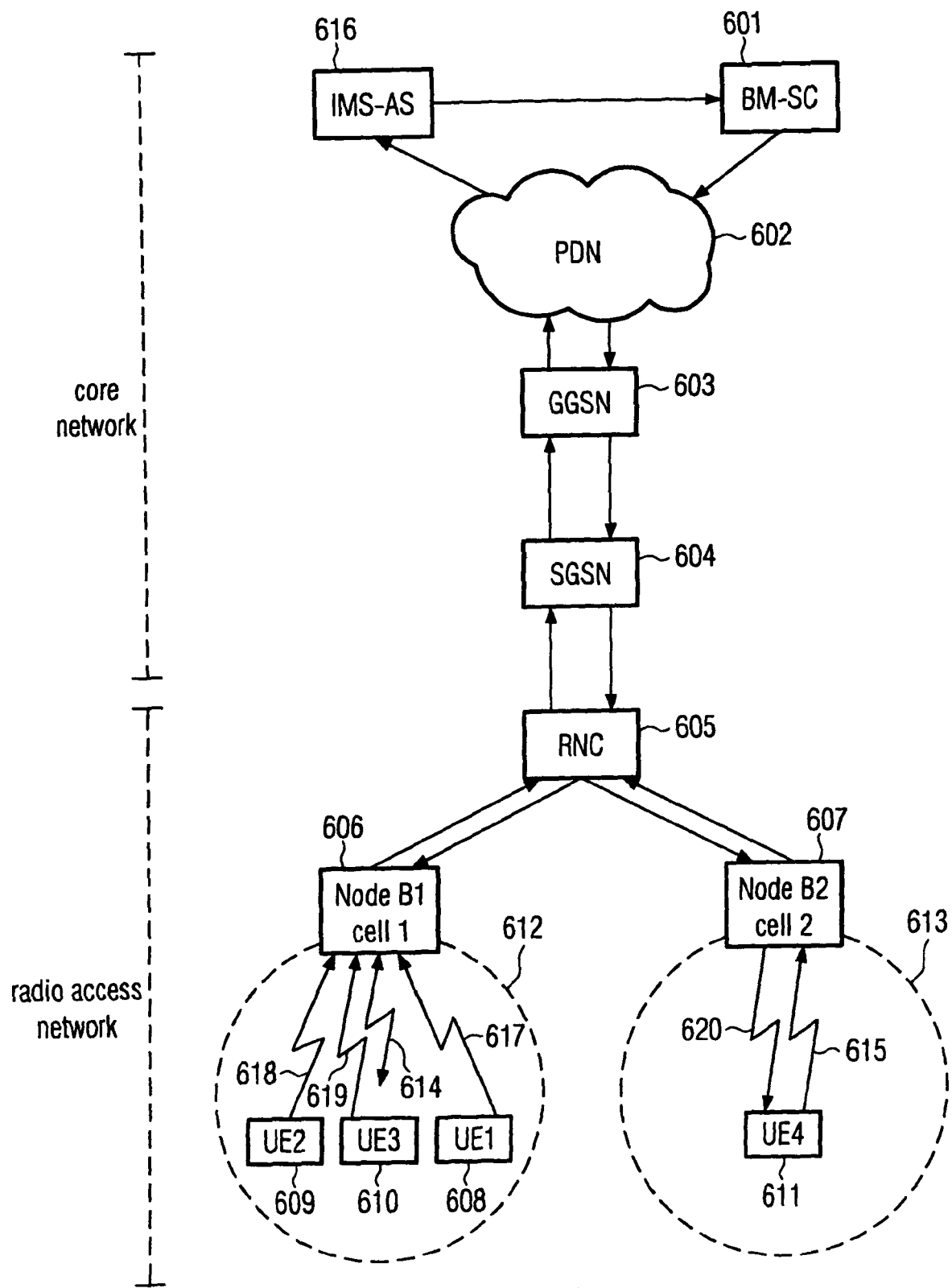
FIG. 6 shows an exemplary MBMS communication system.

FIG. 6 schematically illustrates an exemplary UMTS communication system, in which the embodiments of the invention may be implemented.

The bidirectional multicast service may be an IMS service and the downlink multicast service may be an MBMS service. Accordingly, an IMS application server (IMS-AS) 616 provides an IMS service to a plurality of user equipments 608-611 and hence serves as the source entity for the service data. The IMS service initiates the system resource configuration and establishes connections between the network elements GGSN 603, SGSN 604, RNC 605 and the Node Bs 606, 607. Additionally, dedicated connections (PTP) 617, 618, 619, 615 between the Node Bs to each of the plurality of UE5 are established.

The IMS-AS 616 may decide to use the MBMS service for the downlink service data provision. Consequently downlink data of the IMS service is sent to a Broadcast-Multicast Service Center (BM-SC) 601, being the service provider of the MBMS service. However, it is also possible to implement the IMS-AS 616 and the BM-SC 601 in only one entity. Accordingly, no further interface would be necessary between these two entities.

The BM-SC 601 is the data source for the MBMS data transmission. In this case the MBMS data is the downlink data of the IMS service. Hence the BM-SC 601 may control the scheduling of the IMS downlink data. The service data may be transmitted through a Packet Data Network (PDN) 602, such as the Internet, to a gateway GPRS (General Packet Radio Service) support node (GGSN) 603. The GGSN 603 serves as an entry point for the IP data of the MBMS service. All incoming and outgoing connections go through the GGSN 603. The GGSN 603 forwards the service data to the specific serving GPRS support node (SGSN) 604. The role of the SGSN 604 within the MBMS architecture is to perform MBMS bearer service control functions for each individual user equipment 608-611 and to provide MBMS transmissions to the Radio Access Network (RAN). The network entity 103 of the core network illustrated in FIG. 1 may be the GGSN 603 or the SGSN 604 in the UMTS network. Consequently, in FIG. 1 the control entity 104 of the radio access network may be the RNC 605.

A typical UMTS network is divided into core network (CN), which is responsible for switching and routing calls and data connections and into RAN that handles all radio-related functionality. The core network in this example is composed of the IMS-AS 616, BM-SC 601, the PDN 602, the GGSN 603 and the SGSN 604. Data is forwarded from each entity of the core network to the next, thereby defining an uplink and downlink data path from the MBMS service provider 601 to the access point of the RAN. This entry point to the RAN may be the Radio Network Controller (RNC) 605. System resources are to be configured for the forwarding of data, which may include at least the radio bearer establishment from the RNC 605 to the UE and may further comprise tunnel configuration between the entities GGSN 603, SGSN 604 and the RNC 605.

The RNC 605 controls the different cells 612 and 613 in its domain, via the respective Node Bs 606 and 607. The RNC 605 selectively transmits multimedia data to a particular cell via the respective Node Bs 606, 607. The user equipments 608-611 are located in different cells and are wirelessly provided with the downlink service data by the Node Bs 606 and 607 respectively. The Node Bs 606, 607, under control of the RNC, establish physical channels 614, 615, 617, 618, 619, 620 on the air interface in a certain cell to provide the MBMS service.

To efficiently provide a service to UEs in the RAN, typically a decision is made by the RNC, whether to use point-to-point (dedicated radio bearer) or point-to-multipoint (shared radio bearer) for the transmission of data. A PTP connection is an one-to-one connection between an UE and the RAN, whereas a PTM connection is an one-to-many connection between RAN and a plurality of UEs. A radio bearer may be defined as a logical connection between a network entity in the RAN controlling radio resources and an UE. E.g. in typical mobile communication systems, this network entity in the RAN controlling radio resources is referred to as an RNC. In this case, a radio bearer may comprise the connection from the RNC to a Node B and an air interface connection from the Node B to UE.

The decision of which type of connection to use may be for example based on the number of UEs located in the cell, provided with the particular MBMS service. Typically, there need to be more than just a few UEs to receive the same content in order to make the use of a broadcast channel (a PTM connection) without power control efficient in comparison to dedicated channels. Thereby, an efficient use of the available radio resources can be ensured.

The invention relates to the case in which a PTP connection (dedicated radio bearer) is selected by the RNC for the provision of the downlink IMS data from the RNC to the UE utilizing the MBMS service. According to the exemplary embodiment shown in FIG. 6, the RNC establishes a PTP connection 620 for the sole UE4 611 located in cell 2 613 for the MBMS service, via the Node B2 607.

Although not illustrated in FIG. 6, for one MBMS service a plurality of SGSNs and a plurality of RNCs for each SGSN may be employed for service provision. Each of the SGSNs selectively transmits data to the RNCs, serving the UEs that receive the downlink service and each of the RNCs selectively transmits service data to the UEs in the cells under its control. A list of nodes to which a data stream is to be transmitted may be stored in the network entities of the MBMS architecture. For instance, a list of RNCs is stored in the SGSN and a list of cells is stored in each RNC, to later selectively transmit data only to the nodes specified in the list.

A context, containing a set of information, may be established in the UEs and the network nodes, in order to establish a MBMS service provision by defining the system resources to allocate for the transmissions. E.g. in the MBMS service architecture a MBMS UE context and a MBMS bearer context is established. The MBMS UE context may contain UE specific information related to a particular MBMS bearer service that the UE has joined. The MBMS UE context may be created in the UE, SGSN, GGSN and BM-SC, when the UE joins an MBMS service. The following Table 1 illustrates an exemplary MBMS UE context.

TABLE 1

MBMS UE context

| Parameter | Description |
| --- | --- |
| IP multicast address | IP multicast address identifying an MBMS bearer that the UE has joined. |
| Access Point Name (APN) | Access Point Name on which this IP multicast address is defined. |
| GGSN Address in use | The IP address of the GGSN currently used. |
| SGSN Address | The IP address of the SGSN. |
| TMGI | Temporary Mobile Group Identity allocated to the MBMS bearer. |
| Linked NSAPI | Network Service Access Point Name of the PDP context used by the UE to carry IGMP/MLD signalling. |
| IMSI | International Mobile Station Identity identifying the user. |
| TI | Transaction Identifier |
| MBMS_NSAPI | Network Layer Service Access Point Identifier which identifies an MBMS UE context. |

The parameters define a routing path from the service provider, BM-SC 601 to the user equipment of the context. The specified APN may be used for identifying the MBMS service provided to the UE. The APN is for example a logical name used by the GGSN to determine a service requested by the user or the address of an access point in an external packet network to which user packets should be forwarded.

As mentioned above, contexts are necessary to access a network or provide and receive a particular service. Different contexts are established for the two services IMS and MBMS separately.

For the IMS service, typically a PDP context is created for IMS control signaling and IMS data. Alternatively, two PDP contexts may be established: a primary PDP context may be used for the IMS control signaling and a secondary context may be activated for the IMS data.

The IMS PDP contexts maintained by a network node may contain a set of information the network uses to determine how to forward user packets destined to and originated from a particular service provider. For example, the context may include a PDIP address, which is used by the mobile to send and receive PDP packets. Furthermore, routing information may be comprised in the PDP contexts, including tunnel endpoint identifiers of the tunnels (TEID) and an Access Point Name (APN), which identifies the IMS service.

In addition, Quality of Service Profiles may be defined therein, which however are not relevant for the function of the invention.

Two separate data paths are depicted in FIG. 6, one for uplink and one for downlink. In the following, only UE4 611 with the PTP connections 615, 620 in the RAN will be used for illustration. A MBMS service provider, BM-SC 601, receives the downlink service data from the IMS application server (IMS-AS) 616. The downlink service data is routed through a PDN 602, like the Internet, to the GGSN 603 and forwarded by every network entity of the CN and the RAN to the UE4 611. The uplink path from the UE4 611 goes directly to the IMS-AS 616, without the detour over the BM-SC 601 of the MBMS service. The network entities on the uplink path are in the sequence of UE4 611, RNC 605, SGSN 604, GGSN 603, PDN 602 and the IMS-AS 616.

Figure 7:
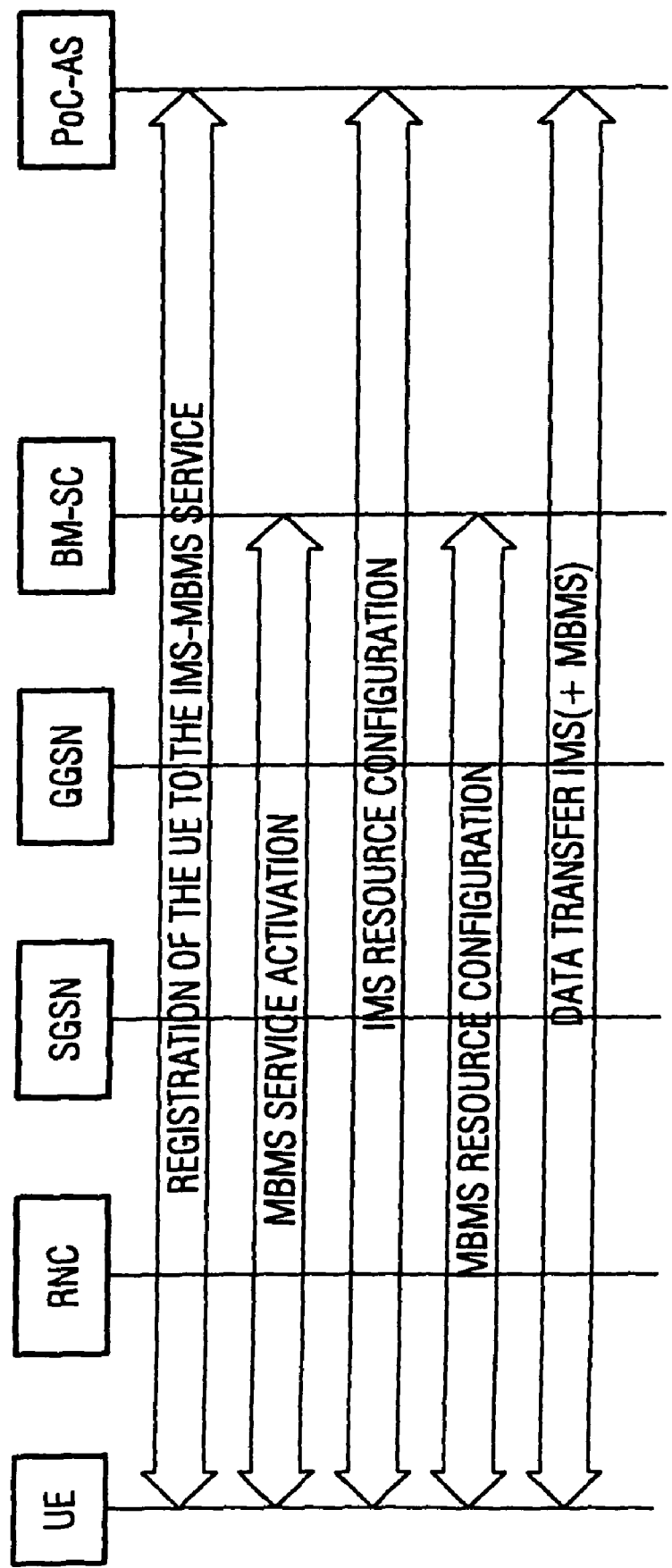
FIG. 7 illustrates a logical sequence chart for an IMS-MBMS service.

The sequence chart of FIG. 7 schematically illustrates a logical sequence of an IMS service provision, which uses the MBMS multicast capabilities for providing the downlink service data to the UE.

First, the UE4 611 may register to the IMS-MBMS service. The term IMS-MBMS service may denote an IMS service, which uses a MBMS service for the downlink provision of IMS service data. In order to use a MBMS service to provide the downlink data, the MBMS service must be activated and necessary contexts are established.

System resources may be configured according to the activated IMS PDP contexts. This may for example include the establishment of a tunnel between the GGSN 603 and the SGSN 604 and a tunnel between the SGSN 604 and the RNC 605. Additionally, a radio bearer may be established between the RNC 605 and the UE4 611. The radio bearer may be identified by a Radio Bearer ID. The Radio Bearer ID may for example be stored in the SGSN 604, the RNC 605 and the UE4 611.

Afterwards, the system resources of the UMTS network for the MBMS service are also configured according to the established contexts. In a conventional MBMS setup procedure, this comprises the set-up of tunnels between the GGSN 603, SGSN 604 and the RNC 605 and comprises the establishment of a radio bearer between the RNC 605 and the UE4 611. The latter can be a dedicated radio bearer or a shared radio bearer. The use of a dedicated radio bearer or a shared radio bearer may for example depend on the number of users receiving the same IMS-MBMS service in the specific radio cell. Regarding cell 2 613 a dedicated radio bearer would be decided for UE4 611. After resource configuration, service data can be transferred to and from the UE4 611 via the established uplink and downlink paths.

In a conventional system, in case the RNC decides to use a PTP link (dedicated radio bearer) for the MBMS service provision of the IMS downlink data, there are two dedicated radio bearers 620, 615 established in the RAN, however each is used only in one direction. During the first part of the described procedure, the IMS service setup, a radio bearer 615 is build-up for the uplink connection and the control signalling to the service provider, through which for example, for a PoC-service, the user voice of the UE is transmitted. In the MBMS service setup, a radio bearer 620 is established exclusively for the downlink transmission of service data, through which for example user voice of other UEs is provided to the user. Resource reservation from the RNC to the Node B is conducted, as well as the reservation of air link resources from the Node B to the user equipment like orthogonalization codes, spreading, etc.

According to an embodiment of the invention, in case a PTP connection is decided for the provision of downlink service data to the mobile terminal, the IMS service does not use the MBMS service to provide the downlink service data, but uses the system resources already established during the IMS service setup, including the dedicated radio bearer.

In the following, the previous embodiment of the invention will be explained in more detail according to FIG. 2.

An IMS application server 201 is the service provider of an IMS service provided to an user equipment 207. The IMS service may be an exemplary UMTS implementation of the bidirectional multicast service. The IMS service uses a MBMS service for the downlink provision of IMS service data, which may correspond to a downlink multicast service. Accordingly, a BM-SC 202 receives service data to be provided to user equipments from the application server 201. A packet data network 203, which can be the Internet, may be located between the service providers IMS-AS 201, BM-SC 202 and the remaining provision network elements. However, for the invention it is of no importance whether a packet data network is in between, or the service providers are located in the same network.

The GGSN 204 serves as a gateway from the PDN 203 to the SGSN 205. Additionally, the GGSN 204 can also be the access point for circuit switched networks like the ISDN network. The SGSN 205 is further connected to the RNC 206 of the radio access network and the RNC 206 is further linked to the user equipment 207. The Node B interconnected between the RNC 206 and the UE 207 is omitted, however it should be noted that the Node B is present and that the RNC 206 communicates with the UE 207 via the Node B.

After the setup of the IMS service, the IMS-AS 201 may then decide to use the MBMS service for the transmission of the downlink data.

In this case, a new MBMS service is established at the BM-SC 202, for example by the IMS application server 201, which registers a group of users to receive the MBMS service for the IMS downlink data. Subsequently, the IMS application server 201 sends corresponding MBMS user service descriptions to the group of users, registered to the IMS-MBMS service.

Thereupon, the MBMS service activation process is started. First, the UE 207 sends a Join message to the GGSN 204, which then transmits an authorization request to the BM-SC 202. After successful authorization, the MBMS contexts are enabled. This includes the activation of a MBMS UE context in the network nodes. Similar to the PDP contexts of the IMS service, the MBMS UE context contains information necessary for the routing of service data. The specific parameters are noted in Table 1 of this description. As apparent from Table 1, the MBMS UE context also includes the APN of the IMS service, which in case of a combined IMS-MBMS service, is identical to the APN in the PDP context, established for the IMS service. The UE 207 must stay in RRC (Radio Resource Control) connected mode so its MBMS UE context is not deleted by the RNC.

Figure 3:
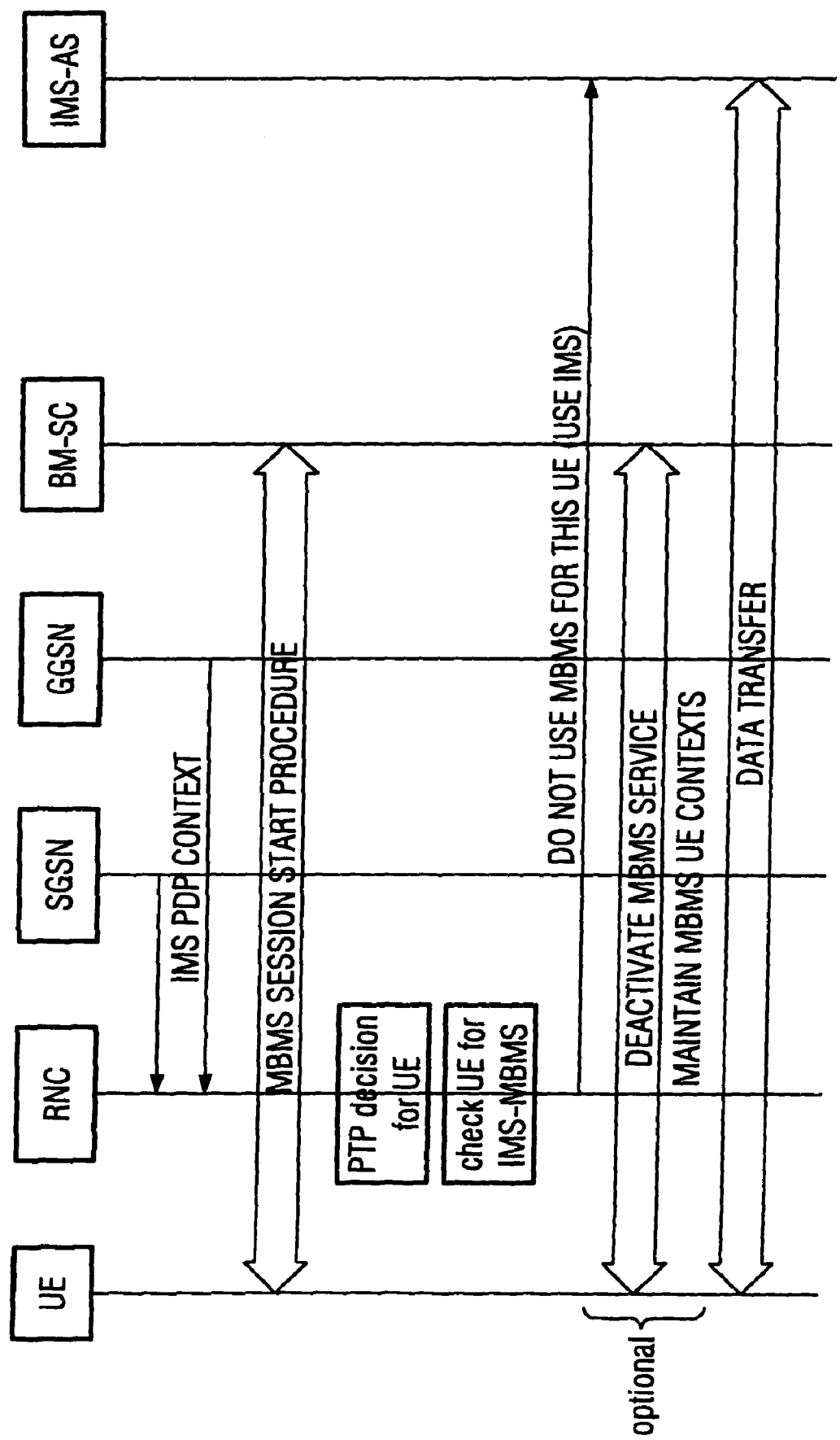
FIG. 3 shows a sequence chart for the configuration of system resources according to one embodiment of the invention.

The subsequent steps are illustrated in FIG. 3. The chart shows a logical sequence conducted according to an embodiment of the invention. It is necessary to first identify which mobile terminal is registered to the IMS-MBMS service, so as to be able to monitor whether a PTP or a PTM radio connection is decided. In this embodiment of the invention, the identification of the mobile terminal, which receives the IMS-MBMS service is conducted in the RNC 206. As the PDP context of the IMS service is not present at the RNC 206, it is necessary to provide the RNC 206 with the necessary information to identify the mobile terminal, which receives the IMS-MBMS service. In the typical UMTS network, the PDP context information is present at the SGSN 205 and the GGSN 204, so any of these two entities can transmit the information to the RNC 206.

More specifically, the GGSN or the SGSN hold an IMSI (International Mobile Station Identity) parameter of the UE 207 in the PDP context, established by the IMS service. During a request for authorization to the BM-SC 202 for the mobile terminal, a MBMS authorization response message including the APN of the MBMS service is transmitted to the network entities of the core network. Furthermore, by comparing the APN of the MBMS UE context and the APN of the PDP context, the RNC 206 is enabled to identify if the service provided to the specific UE is an IMS-MBMS service.

Subsequently, the MBMS session start procedure is initiated by the BM-SC 202 and forwarded via the network elements to the RNC 206. The procedure is a request to activate all necessary bearer resources in the network for the transfer of MBMS data and to notify registered UEs of the imminent start of the transmission.

The MBMS session start procedure is conducted as far as the RNC 206. Before the typical RAN resource setup, if the RNC 206 decides to use a PTP link for the particular UE 207, the RNC checks the information of the PDP context, received from the GGSN or SGSN and compares the included APN with the APN of the MBMS UE context. If the APNs are identical, the particular UE 207 is registered to an IMS-MBMS service.

The before mentioned cross-check of the APNs of the respective IMS and MBMS contexts, may also be conducted immediately after the receipt of the PDP context for the mobile terminal. In said case, after the identification, a table would be configured, thereby including the identified mobile terminal, that receives the IMS-MBMS service. In case a PTP connection is decided for a mobile terminal, the RNC 206 would check said table, whether the mobile terminal is a mobile terminal that receives the IMS-MBMS service or not.

In another embodiment of the invention, the identification of said mobile terminal, receiving the IMS-MBMS service is carried out in another entity of the mobile communication system. For example, in the following this will be explained for the GGSN 204, but may apply accordingly to the SGSN 205.

During the MBMS service activation process and after IMS service setup, the UE 407 transmits a Join message to the GGSN 204. The Join message may be transmitted to the GGSN 204 via the already established IMS data bearer, defined by the secondary PDP context or via the IMS control signaling bearer, defined by the primary PDP context. The GGSN 204 then requests authorization of the BM-SC 202, which if successful provokes a MBMS authorization response message including the APN of the MBMS service.

The GGSN 204 holds the IMSI (International Mobile Station Identity) parameter of the UE 207 in the PDP context of the IMS service. Furthermore, by comparing the APN of the MBMS UE context and the APN of the PDP context, it is possible to identify if the service provided to the specific UE 207 is an IMS-MBMS service. In case the provided service is an IMS-MBMS service, the GGSN 204 notes this particular UE 207 in a table, including the corresponding APN parameter of the IMS service. The GGSN 204 notifies the RNC 206 about this particular UE 207 either directly or via the SGSN 205.

The MBMS session start procedure is then initiated and proceeded as far as the RNC 206. Before the typical RAN resource setup, if the RNC 206 decides to use a PTP link for a particular UE, the RNC 206 checks if the particular UE is the UE 207 specified by the notification received from the GGSN 204.

If the UE is the specified UE 207, registered to receive the IMS-MBMS service, the RNC 206 will notify the IMS-AS 201 either directly or via the GGSN 204 about this specific UE 207. After this notification from the RNC 206 to the IMS-AS 201 or the GGSN 204, the RNC 206 will not start resource reservation during the RAN resource setup procedure for the MBMS service.

The IMS-AS, when receiving the notification will not use the MBMS service for the downlink provision of the IMS service data. Instead, the IMS service and the system resources already established for the IMS service are utilized for providing the downlink data to the mobile terminal. This includes to utilize the already established dedicated radio bearer 208 of the IMS service instead of establishing an additional dedicated radio bearer for the MBMS service and thereby saving radio resources. Thus, the radio bearer 208 is used for the uplink connection and control signaling from the UE 207 to the IMS application server 201, as well as for the downlink connection from the IMS-AS 201 to the UE 207 (solid lines). According to the embodiment of the invention, no radio resources are wasted for an additional dedicated radio bearer in the MBMS service setup. Now after complete system resources setup the data transfer may be initiated.

In addition, because no MBMS service is utilized for the mobile terminal if a PTP connection is decided, no additional tunnels in the core network are established.

The configuration of tunnels in the core network may include explicit resource reservation depending on the implementation and the appliance of the tunnel. In a standard UMTS implementation for voice calling it may not be necessary to reserve resources like bandwidth etc. However, for appliances like video conferencing or video streaming, which need more resources it may be advisable to conduct an explicit resource reservation according to the set Quality of Service (QoS) parameters of the specific tunnel. Accordingly, system resources may be saved as no additional tunnels are established.

In case a PTM connection is decided by the RNC during the MBMS session start procedure, the MBMS service is utilized to provide the IMS downlink data to the mobile terminal 207 (dashed lines). This may include connections between network entities, like BM-SC 202, PDN 203, GGSN 204, SGSN 205 and the RNC 206. Furthermore, the configuration of the system resources in said PTM connection mode further comprises the PTP radio bearer 208, which was established during IMS service setup. The radio bearer 208 is mainly used for uplink transmissions from the UE 207 to the IMS-AS, this being indicated by arrowheads. Additionally, a PTM shared radio bearer 210 is utilized for providing the downlink service data to the UE 207.

In an advantageous embodiment the MBMS service may additionally be deactivated, if a PTP connection is decided for the downlink provision, because it is no longer used by the IMS service for the specific mobile terminal. This may include a standard deactivation procedure, standardized by the 3GPP (see 3GPP TS 23.246 v6.6.0: "Multimedia Broadcast/Multicast Service (MBMS); Architecture and functional description (Release 6)", incorporated herein by reference, available from http://www.3gpp.org). The MBMS service deactivation typically includes signaling related to De-Linking, De-Register and De-Activation. Furthermore, during the MBMS service deactivation for the mobile terminal 207, the respective MBMS UE contexts are first deactivated and then deleted. During the de-activation procedure the BM-SC, the RNC, the SGSN, the GGSN and the mobile terminal are notified to de-activate the MBMS service. Furthermore, the de-activation messages may be send for example from the SGSN or GGSN, or the RNC, mobile terminal or the BM-SC. However, this only represents an additional and advantageous embodiment of the invention.

In another embodiment of the invention the deactivation procedure of the MBMS service differs from the standardized MBMS service deactivation, according to 3GPP.

The MBMS UE contexts are deactivated but not deleted during the MBMS service deactivation, hence this may be called soft-de-activation. The MBMS UE contexts may be maintained in the network entities involved. This is advantageous when the mobile terminal receives the IMS downlink data via the MBMS service in the near future. The soft-de-activated MBMS UE contexts may be re-activated during a later MBMS setup procedure. At the beginning of the MBMS setup, the MBMS service checks if MBMS UE contexts are soft-de-activated for the mobile terminal, for which the MBMS service setup is to be conducted. If some MBMS UE contexts are present at the network entities, they are then re-activated, which results in an accelerated setup. If there are no MBMS UE contexts pre-configured for the mobile terminal, a usual MBMS setup is conducted, during which the necessary MBMS UE contexts are established.

According to the above described embodiment, a fast and efficient switching between system resources is possible during data provision. The mobile terminal is being provided with the IMS service, wherein the IMS downlink service data for example is transmitted via the MBMS service and a PTM connection in the RAN. In case the radio conditions change in the current radio cell, due for example to a different number of UEs receiving the IMS-MBMS service, the RNC may decide to use a PTP connection to the mobile terminal. Consequently, according to the invention, the IMS-AS is notified of this change in the transmission conditions in the RAN. The IMS-AS then does not use the MBMS service anymore for providing the IMS downlink service data, but utilizes instead the system resources of the IMS service, which include a dedicated radio bearer connection in the RAN to the mobile terminal.

Thereafter, the MBMS service may be deactivated for the mobile terminal. However, the MBMS UE contexts are not deleted, but merely soft-de-activated.

During the IMS service provision to the mobile terminal, the radio conditions in the radio cell may change again and the RNC now decides for a PTM connection to the mobile terminal. In this case, the IMS-AS activates a MBMS service to utilize the multicast capabilities of MBMS service framework and provide the IMS downlink service data via the MBMS service. The MBMS service notices that for the specific mobile terminal MBMS UE contexts are soft-de-activated and re-activates said MBMS UE contexts. This results in a more efficient and faster MBMS setup. Accordingly, depending on the radio conditions for the mobile terminal the MBMS resources may be switched on and off, due to decided connection to the mobile terminal.

More specifically, a network entity, for example the SGSN will proceed to notify the transmission mode decision point, in this case the RNC, about which UE is using a combined IMS-MBMS service. MBMS related network entities, like for example the GGSN and the BM-SC server will keep the UE related contexts on hold, meaning that they will not delete the MBMS UE contexts in the participating entities, until the MBMS service session is finished Accordingly, if a mobile terminal receiving a PTP service, handoffs to a cell with a PTM service active and a PTM connection is decided for the mobile terminal, the RNC will notify a network entity, e.g. the SGSN about which UE with combined IMS-MBMS service is moved to PTM. In addition, it will proceed to inform the UE with RAN commands about the new radio bearer information. The notification from the RNC will trigger the network entity to send a message to the IMS-AS server to stop sending data through the IMS bearer to the UE. In addition, this network entity will send messages to other network entities, including the mobile terminal to re-activate the MBMS context for that specific UE.

In case that several mobile terminals with a PTP service move to a specific cell and critical mass is reached a re-counting takes place in said cell, and a PTM mode is decided. Accordingly, as a PTM service is determined to be more efficient, the RNC will notify a network entity, e.g. the SGSN that all these mobile terminals with combined IMS-MBMS service will be moved to PTM. This notification will trigger the network entity to send a message to IMS-AS server to stop sending data through the IMS bearer to these mobile terminals. In addition, this network entity will send messages to other network entities, including the mobile terminals to re-activate MBMS context for those UES.

In another embodiment of the invention the decision whether to use the MBMS service or not is already made during the IMS service setup instead of during the MBMS session start procedure.

A mobile terminal registers to the IMS-MBMS service and the IMS service is setup, including the establishment of PDP contexts and the configuration of system resources of the mobile communication system in the core network and the radio access network.

After the establishment of the dedicated radio bearer to the mobile terminal for the IMS service, the RNC may estimate adequate radio resources necessary for a future downlink provision via a MBMS service to the mobile terminal. Based on this estimation, the RNC is able to determine if a PTP or PTM connection will be established for the MBMS service. In case a PTP connection is estimated by the RNC, a notification including this information is transmitted to the IMS-AS, which then decides not to use the MBMS service. The IMS-AS then utilizes the system resources configured for the IMS service to provide the downlink service data. In case a PTM connection is estimated by the RNC, also a notification including this information is transmitted to the IMS-AS, which then start a MBMS service activation for the mobile terminal, in order to provided the downlink data via the MBMS service.

Figure 4:
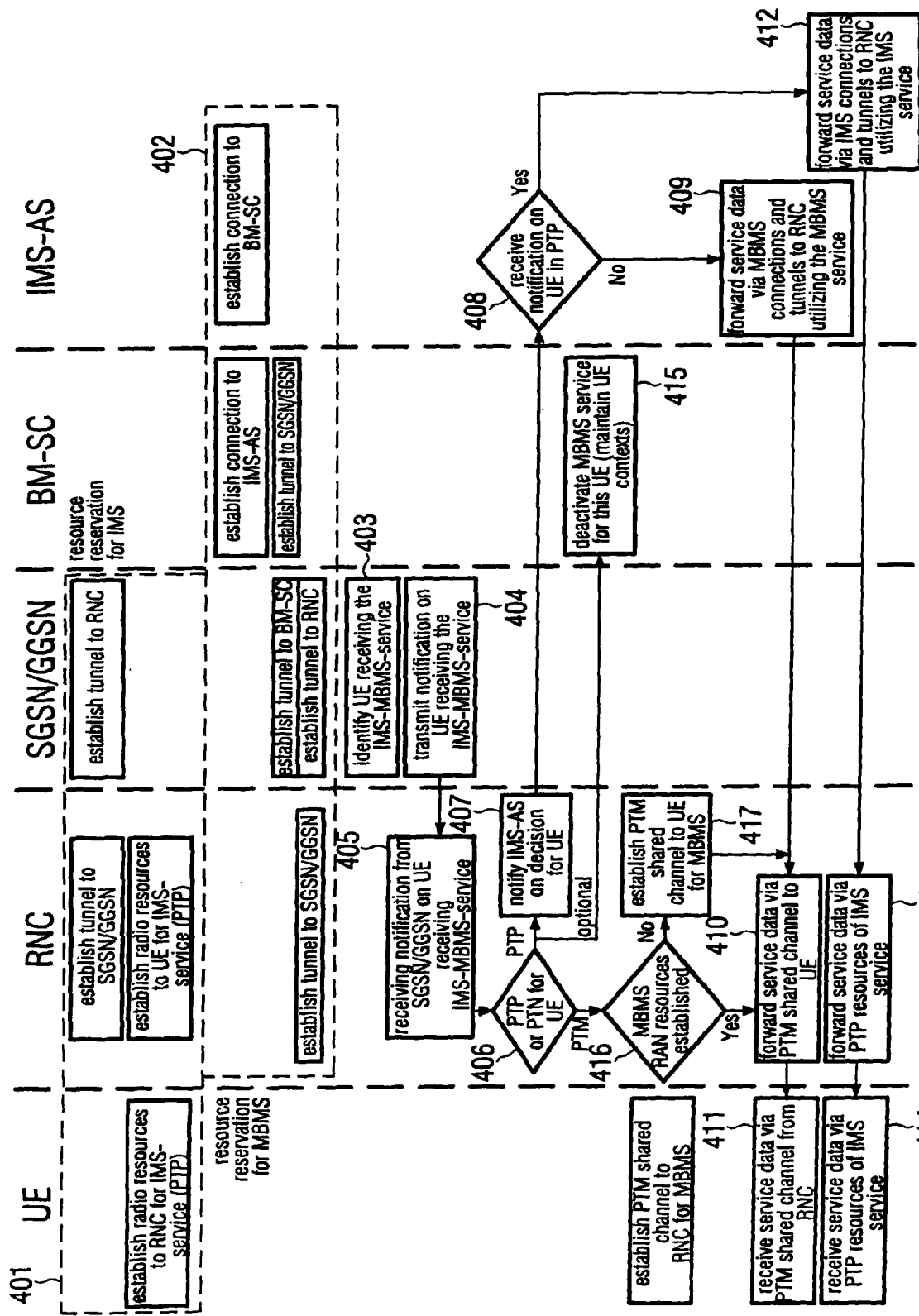
FIG. 4 shows a flow chart of an IMS-MBMS service setup.

In FIG. 4 a flow chart of an IMS-MBMS service setup is illustrated. This is a schematic flow chart that explains only logically the setup procedure. The network system therein is comparable to that of FIG. 2, and is composed of a mobile terminal (UE), a radio network controller (RNC), a network entity in the core network that may be the SGSN or the GGSN, a Broadcast Multicast-Service Center (BM-SC) and an IMS Application Server (IMS-AS).

The flow chart starts with resource configuration 401 for the IMS service. This mainly includes the establishment of a tunnel between SGSN/GGSN and RNC and a radio bearer between RNC and the UE. Subsequently, the IMS-AS decides to use a MBMS service to provide the downlink service data to the mobile terminal. Hence, system resources are configured and reserved 402 for the MBMS service. This mainly includes a connection between the IMS-AS and the BM-SC, via which the IMS-AS transmits the downlink service data to the BM-SC. Furthermore, the MBMS resource configuration comprises tunnels between the BM-SC and the SGSN/GGSN and between the SGSN/GGSN and the RNC.

The SGSN/GGSN hold the necessary information for identifying 403 the UEs, which are registered to the bidirectional service (IMS) using the downlink multicast service (MBMS). Consequently, according to one embodiment of the invention, the SGSN/GGSN notifies 404 the RNC on the identified UE. The RNC receives 405 this information. During the resources configuration of the MBMS service, the RNC holds this information and the RNC decides 406 whether to utilize a PTP or a PTM connection. In case the RNC decides for a PTP connection to the UE, the RNC checks for the UE and if the UE is a User receiving the IMS-MBMS service a notification is sent 407 to the IMS-AS including information on the decision and on the mobile terminal. Furthermore, the MBMS service setup is interrupted. At this point, it is optional if the RNC additionally sends 415 a de-activation notification to the BM-SC, prompting to de-activate the MBMS service for this specific UE. Still optionally, during the de-activation of the MBMS service, for further use the MBMS UE contexts may be soft-de-activated but not deleted.

If the IMS-AS receives 408 the notification from the RNC, which is this case here, the IMS-AS no longer uses the MBMS service to provide the downlink service data to the mobile terminal. Instead, the IMS-Service utilizes the connections, established during the resource reservation 401 for IMS, to forward 412 the downlink service data to the RNC and furthermore 413 to the UE via the PTP resources of the IMS service.

As mentioned above, the RNC decides 406 whether to use a PTP or a PTM connection to the mobile terminal. In case a PTM connection has been decided, the MBMS setup is proceeded and the RNC checks 416 if MBMS RAN resources are already established. If no RAN resources are available for MBMS a PTM shared channel is configured 417 to the mobile terminal.

In addition, in case the RNC decides for PTM, no notification is sent to the IMS-AS and the IMS-AS accordingly does not receive any notification in this regard. Subsequently, the IMS-AS forwards 409 the downlink service data, using the MBMS service via the system resources configured and reserved for the MBMS service.

The downlink service data is received in the RNC and forwarded 410 via the already available shared radio bearer or via the just established radio bearer to the mobile terminal. The UE then receives 411 the downlink service data via the PTM shared channel.

Figure 5:
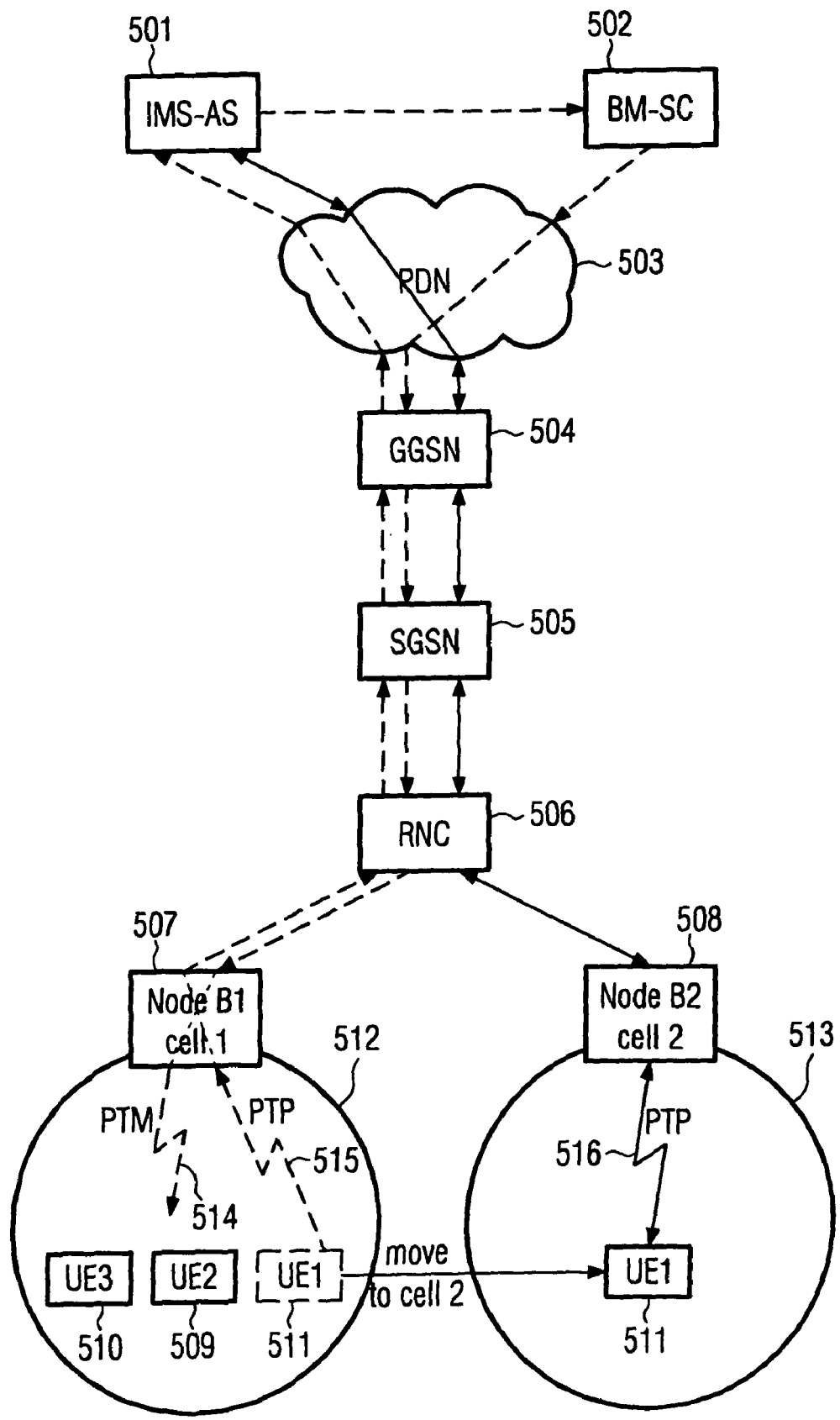
FIG. 5 shows an UMTS network according to another embodiment of the invention, wherein a hand-over procedure is illustrated.

In FIG. 5 an UMTS network is illustrated, including an IMS application server 501, which acts as a service provider. The IMS service is provided to a plurality of UEs, UE1 511, UE2 509 and UE3 510. The network nodes GGSN 504, SGSN 505 and RNC 506 forward service data destined to and transmitted from the UEs. Two base stations Node B1 507 and Node B2 508 are connected to the RNC 506, supplying two different radio cells 512, 513. By means of this figure a hand over procedure between two cells shall be explained.

Presumably, at the beginning three UEs 509-511 are located in cell 1 512. The service data may be provided via a PTM link 514 from the Node B1 507 to all UEs registered to the service in this radio cell, which in this case amounts to the three UEs 509-511. In addition, a dedicated radio bearer 515 is already established for the IMS service and the UE1 511 for transmitting service data from the mobile terminal 511 to the Node B1 507.

The remaining dedicated bearers for the uplink transmission of the IMS service from UEs 509, 510 to the Node B1 are omitted, but nevertheless already established too.

The dashed lines illustrate the established connections for the provision of the IMS service to the UE1 511. This comprises the above mentioned PTM radio bearer 514, the PTP radio bearer 515, respectively two connections between Node B1 507, RNC 506, SGSN 505, GGSN 504 and the PDN 503. Furthermore, connections are established for transmitting service data from the IMS-AS 501 to the PDN 503 via the BM-SC 502 of the MBMS service. Finally, one link is directly connected from the PDN 503 to the IMS-AS 501. The arrowheads of the illustrated dashed lines indicate the transmission directions in which the connections are mainly used.

In case the UE1 511 moves from cell 1 512, the source cell, to cell 2 513, the target cell, the RNC checks for the quantity of UEs receiving the service in radio cell 2 513. Presumably, there are no other UEs in cell 2, hence the RNC may decide for a PTP connection for UE1 511. The IMS dedicated radio bearer 516 is established and according to the previous embodiments of the invention, the IMS-AS is notified to no longer use the MBMS service to provide the IMS downlink service data to the UE1. Instead, the IMS-AS 501 transmits its downlink service data via the established system resources. The solid, continuous lines illustrate this connectivity. This includes the PTP connection 516 and in this case only one connection respectively between the involved network entities, Node B2 508, RNC 506, SGSN 505, GGSN 504, PDN 503 and the IMS-AS 501. Finally, the Node B1 507 tears down the PTP connection 515 configured for the uplink data from UE1 and releases the system resources reserved in this respect.

Furthermore, according to the above presented embodiments of the invention, it is further possible to start a deactivation procedure of the MBMS service, during which the MBMS UE contexts may be deleted or maintained. If the MBMS UE contexts are not deleted, but only soft-de-activated in the network entities and if the UE1 changes back to PTM connectivity the MBMS service may be setup faster and more efficient, because the MBMS UE contexts are already established and have only to be re-activated. This maintained contexts may define all connections in the core network and in the radio access network. It is also possible to only maintain those system resources reserved for the core network and release the radio resources reserved for the shared radio bearer, because usually these radio resources are more important.

This case, wherein a UEs changes during a hand-over procedure from a PTP connection to a PTM connection is not illustrated in FIG. 5. However, a short explanation therefore will be given in the following.

Presumably, the UE1 is located in radio cell 2 513, the source cell, and moves to radio cell 1 512, the target cell. In cell 2 a PTP connection to the UE for the MBMS service was decided, regarding the low number of UEs registered to the service in this radio cell. During a hand-over to a target cell, wherein a plurality of UEs already receive the service via a PTM connection, the RNC knows that other UEs receive the same service in the target cell via a shared radio bearer. The UE will conduct a hand-over procedure to the target cell and acquires the necessary radio bearer information on the PTM connection and in addition on the connections in the core network. The UE1 then listens to the MBMS service over the PTM connection in the target cell. Besides, the RNC tears down the previous PTP radio bearer service 516 of the UE in the source cell 513. Furthermore, a new PTP connection in the RAN has to be configured for the UE1, which is then mainly used for uplink connectivity. Additionally, notification messages to the GGSN 504 or SGSN 505, depending on the employed specific embodiment of the invention, must be transmitted in order to inform the IMS-AS that the mobile terminal UE1 511, receives the downlink service data utilizing the MBMS service.

Moreover, according to an advantageous embodiment of the invention, it is possible to conduct a pre-configuration of the MBMS service for users that are registered to the IMS service and may receive downlink multicast service data of the IMS service via the MBMS service. The setup of the MBMS service is initiated by the IMS service, which may utilize the MBMS service in the near future to transmit the downlink multicast service data. The IMS service knows which mobile terminals receive the IMS service and transmits the information about said mobile terminals to the MBMS service, thereby registering the mobile terminals to the MBMS service. This respectively comprises configuration and reservation of system resources for each mobile terminal. The established system resources may then be soft-de-activated and in case a mobile terminal is to be provided with the downlink service data via the MBMS service, it suffices to re-activate said system resources, as they are already established.

Figure 2:
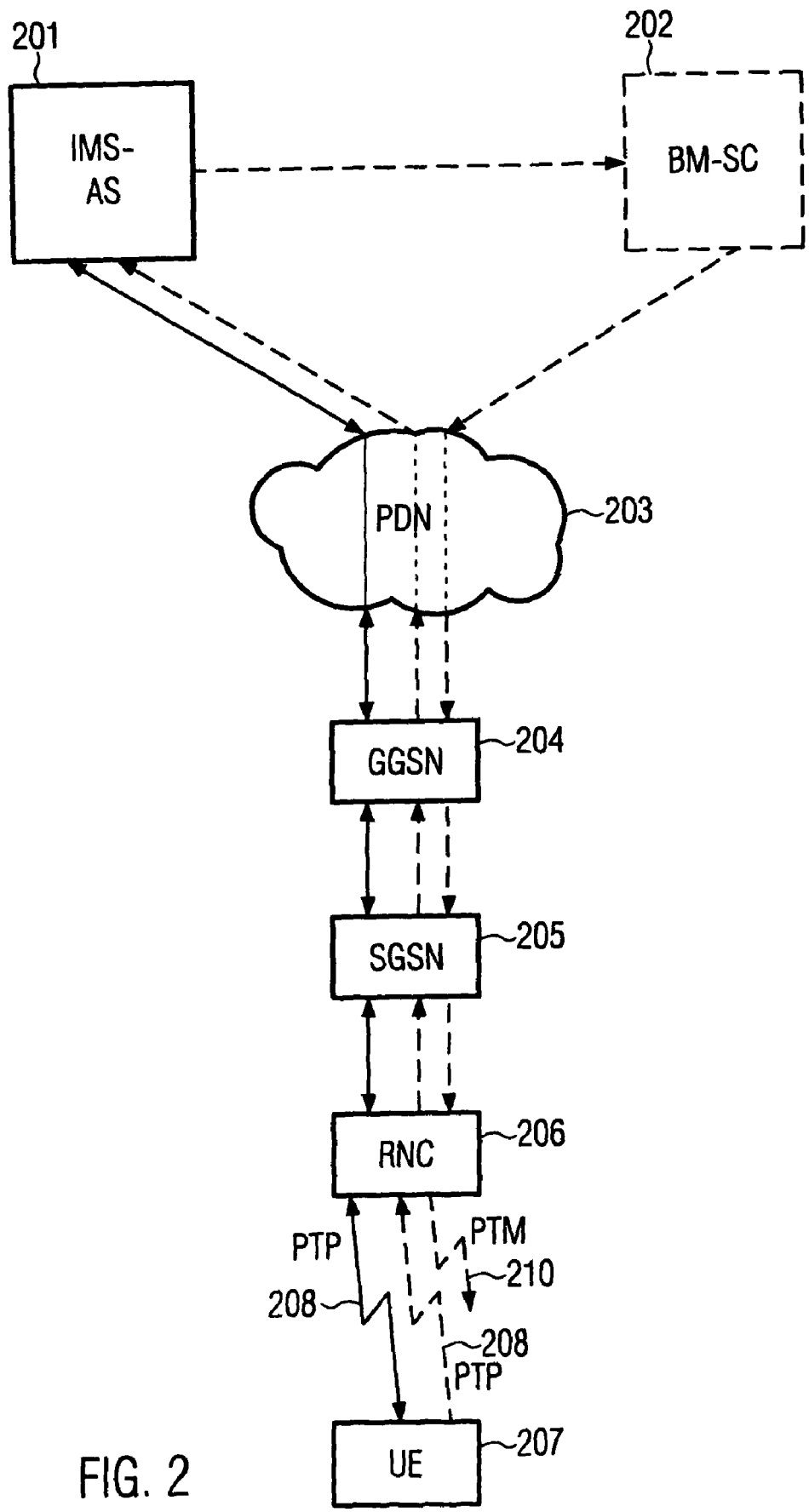
FIG. 2 shows an UMTS communication system according to one embodiment of the invention.

It should be further noted that the invention can be used in systems as described in the above embodiments and the corresponding UMTS networks illustrated in the FIGS. 2 and 5, but is not limited to the use in these systems. Rather, an UMTS network architecture with other core network entities is possible. Instead of using a SGSN and a GGSN as core network elements, for example a gateway may be implemented as sole access point to a PDN and to a RNC. The gateway would then be used as a network entity in the embodiments of the invention.

Another possibility for identifying the user terminal using the combined IMS-MBMS service is to introduce an unique multicast identifier, exclusively for these specific IMS-MBMS service. This could be for example a unique Access Point Name (APN), "ims-mbms.server.com". This approach makes it unnecessary to compare the two multicast identifiers in the contexts, activated for the IMS and the MBMS service setup. Furthermore, regarding the embodiment of FIGS. 2 and 3, by using a unique APN it is no longer necessary at the beginning to transmit an IMS PDP context from the GGSN or the SGSN to the RNC, so as to provide the RNC with the information (APN) for linking the two services together. It suffices to check the MBMS UE context stored in the RNC and look for the APN to unambiguously identify the UE with the IMS-MBMS service.

Another embodiment of the invention relates to the implementation of the above described various embodiments using hardware and software. It is recognized that the various embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the present invention may also be implemented by means of software modules which are executed by a processor or directly in hardware. Also a combination of software modules and a hardware implementation may be possible. The software modules or instructions may be stored on any kind of computer readable storage media, for example RAM, EPROM, EEPROM, flash memory, registers, hard disks, CD-ROM, DVD, etc.

The invention claimed is:

1. A method for providing a bidirectional multicast service from a bidirectional multicast service provider to a mobile terminal within a mobile communication system, the mobile communication system comprising a core network and a radio access network, the method comprising the steps of:
   configuring system resources for the bidirectional multicast service in the mobile communication system for the transmission of multicast service data of the bidirectional multicast service, wherein the configuring of the system resources for the bidirectional multicast service comprises the establishment of a bidirectional radio bearer between the mobile terminal and a control entity controlling radio resources of the radio access network,
   configuring system resources for a downlink multicast service in the core network for the transmission of downlink multicast service data of the bidirectional multicast service via the downlink multicast service,
   deciding whether to utilize a point-to-point connection or a point-to-multipoint connection in the radio access network for providing the downlink multicast service data of the bidirectional multicast service to the mobile terminal, in case it has been decided to utilize the point-to-point connection, utilizing the system resources established for the bidirectional multicast service to provide the downlink multicast service data to the mobile terminal, and in case it has been decided to utilize the point-to-multipoint connection, utilizing the system resources of the core network established for the downlink multicast service for transport of the downlink multicast service data in the core network and establishing a shared radio bearer or using an established shared radio bearer in the radio access network for providing the downlink multicast service data to the mobile terminal.

2. The method of claim 1, wherein the configuring of the system resources for the bidirectional multicast service further includes the establishment of a connection between a network entity in the core network and the control entity in the radio access network and in ease it has been decided to utilize the point-to-point connection, further utilizing said connection between the network entity in the core network and the control entity in the radio access network for the transmission of the downlink multicast service data.

3. The method of claim 1, wherein the multicast service data includes uplink multicast service data and downlink multicast service data and wherein in case it has been decided to utilize the point-to-multipoint connection, the uplink multicast service data is transported utilizing the system resources configured for the bidirectional multicast service and the downlink multicast service data is transported utilizing the system resources configured for the downlink multicast service.

4. The method of claim 1 wherein the multicast service data includes uplink multicast service data and downlink multicast service data and wherein in ease it has been decided to utilize the point-to-point connection, the uplink multicast service data and the downlink multicast service data are transported utilizing the system resources configured for the bidirectional multicast service.

5. The method of claim 1, wherein the configuring of the system resources in the core network for the downlink multicast service includes an activation of the system resources in the core network and the method further includes the step of:

in case it has been decided to utilize the point-to-point connection, de-activating the downlink multicast service for the mobile terminal utilizing the point-to-point connection, including releasing the system resources in the core network configured for the downlink multicast service.

6. The method of claim 1, wherein the configuring of the system resources in the core network for the downlink multicast service includes an activation of the system resources and the method further includes the step of:

in case it has been decided to utilize the point-to-point connection, soft-de-activating the downlink multicast service for the mobile terminal utilizing the point-to-point connection, including maintaining the system resources in the core network configured for the downlink multicast service.

7. The method of claim 6, wherein the downlink multicast service data is being provided via the point-to-point connection to the mobile terminal and wherein maintaining the system resources in the core network configured for the downlink multicast service includes the step of soft-de-activating the system resources and the method further comprises the step of:

in case it is decided to utilize the point-to-multipoint connection, re-activating the maintained system resources in the core network for transmitting the downlink multicast service data in the core network via the downlink multicast service.

8. The method of claim 5, wherein the downlink multicast service is provided from a downlink multicast service provider and wherein the soft-de-activation or de-activation of the downlink multicast service includes the step of:

notifying the downlink multicast service provider, the control entity in the radio access network, the network entity and the mobile terminal to soft-de-activate or de-activate the downlink multicast service for the mobile terminal.

9. The method of claim 8, wherein notification messages for soft-de-activating or de-activating the downlink multicast service originate from a network entity in the core network or the control entity in the radio access network or the mobile terminal or the downlink multicast service provider.

10. The method of claim 1, wherein the bidirectional multicast service is assigned a multicast service identifier.

11. The method of claim 10, wherein the multicast service identifier is an Access Point Name or an Internet Protocol multicast address.

12. The method of claim 1, wherein the configuring of the system resources for the bidirectional multicast service further includes activating a context for bidirectional multicast service related control signaling and for bidirectional multicast service data transfer at least in a network entity of the core network, the context comprising routing information on the routing of the multicast service data in the configured system resources to provide the bidirectional multicast service from the bidirectional multicast service provider to the mobile terminal and further comprising a multicast service identifier.

13. The method of claim 1, wherein the configuring of the system resources for the bidirectional multicast service further includes activating a control signaling context for bidirectional multicast service related control signaling comprising routing information on the routing of control signaling in the configured system resources and further comprising a multicast service identifier and further includes activating a data context for bidirectional multicast service data transfer comprising routing information on the routing of multicast service data provided from the bidirectional multicast service provider to the mobile terminal in the configured system resources being identified by a resource identifier and further comprising a multicast service identifier at least in a network entity of the core network.

14. The method of claim 1, wherein the configuring of the system resources for the downlink multicast service in the core network includes activating a mobile terminal related context of the downlink multicast service at least in a network entity of the core network, the mobile terminal related context comprising information on the mobile terminal and information on the downlink multicast services the mobile terminal is registered to and comprising a multicast service identifier.

15. The method of claim 14, wherein the mobile terminal related context activated for the downlink multi cast service is maintained in case it has been decided to use the point-to-point connection in the radio access network.

16. The method of claim 15, wherein the downlink multicast service data is being provided to the mobile terminal via the point-to-point connection in the radio access network configured for the bidirectional multicast service and wherein in case it is decided to utilize the point-to-multipoint connection, the method further comprises utilizing the maintained mobile terminal related context activated for the downlink multicast service for transporting the downlink multicast service data in the core network via the downlink multicast service.

17. The method of claim 15, wherein the mobile terminal related context activated for the downlink multicast service is deleted in case it has been decided to use the point-to-point connection in the radio access network.

18. The method of claim 13, further comprising the step of identifying the mobile terminal, which is provided with the bidirectional multicast service and uses the downlink multicast service for transmitting the downlink multicast service data, by comparing the multicast service identifiers comprised in the control signaling context and a mobile terminal related context.

19. The method of claim 10, wherein the multicast service identifier is unique to a bidirectional multicast service utilizing the downlink multicast service for providing the downlink multicast service data of the bidirectional multicast service.

20. The method of claim 19, further comprising the step of identifying the mobile terminal, which is provided with the bidirectional multicast service and receives the downlink multicast service data of the bidirectional multicast service utilizing the downlink multicast service, based on the unique multicast service identifier.

21. The method of claim 18, wherein the step of identifying the mobile terminal is conducted by a network entity of the core network or the control entity of the radio access network.

22. The method of claim 2, wherein the decision whether to utilize the point-to-point connection or the point-to-multipoint connection is made by the control entity and the method further comprises the steps of:
informing the control entity for controlling the radio resources of the radio access network by a network entity in the core network on the mobile terminal having requested the bidirectional multicast service, and
transmitting a notification message to the network entity in the core network to inform the network entity on the decision to utilize the point-to-point connection, the notification message comprising information on the mobile terminal to be utilizing the point-to-point connection and information on the multicast service.

23. The method of claim 2, wherein the network entity is a gateway General Packet Radio Service (GPRS) support node or a serving GPRS support node in the core network.

24. The method of claim 1, wherein the bidirectional multicast service is identified by a multicast service identifier and the method further comprises the step of:
transmitting an activation message from the mobile terminal to a downlink multicast service provider for activating the downlink multicast service to be used for the transmission of downlink multicast service data.

25. The method of claim 24, further comprising the steps of:
authorizing the mobile terminal by the downlink multicast service provider to receive the downlink multicast service data, and
if authorization is successful, receiving by a network entity of the core network a notification including the multicast service identifier of the bidirectional multicast service.

26. The method of claim 1, wherein the mobile terminal is located in a source cell, and wherein the bidirectional multicast service is provided to further mobile terminals within the mobile communication system, located in a target cell, wherein in the target cell system resources are configured for providing multicast service data of the bidirectional multicast service to the further mobile terminals and the method further comprises the steps of:
utilizing the system resources configured for the further mobile terminals of the target cell for providing the bidirectional multicast service to the mobile terminal, and
releasing the configured system resources configured for the mobile terminal in the source cell, when handing over the mobile terminal from the source cell to the target cell.

27. The method of claim 26, wherein the configured system resources in the target cell include an established point-to-multipoint connection between a control entity of the radio access network and the further mobile terminals, the step of utilizing the configured system resources in the target cell comprises transmitting the downlink multicast service data to the mobile terminal via the established point-to-multipoint connection for the further mobile terminals, and the method further comprises the step of:
notifying the control entity of the radio access network to release the bidirectional radio bearer configured for the bidirectional multicast service for the mobile terminal in the source cell.

28. The method of claim 26, wherein the configured system resources in the target cell include an established connection between a network entity of the core network and the control entity of the radio access network and a point-to-multipoint connection between the control entity of the radio access network and the further mobile terminals, and the step of utilizing the configured system resources in the target cell comprises transmitting the downlink multicast service data to the mobile terminal utilizing said established connection and said established point-to-multipoint connection for the further mobile terminals, and the method further comprises the steps of:
notifying the network entity of the core network to release a configured connection between the network entity and the control entity for the mobile terminal in the source cell, and
notifying the control entity of the radio access network to release the bidirectional radio bearer configured for the bidirectional multicast service for the mobile terminal in the source cell.

29. The method of claim 15, further comprising the step of identifying the mobile terminal, which is provided with the bidirectional multicast service and uses the downlink multicast service for transmitting the downlink multicast service data by comparing the multicast service identifiers comprised in a control signaling context and the mobile terminal related context.

30. A method for changing system resources for providing a bidirectional multicast service from a multicast service provider to a mobile terminal within a mobile communication system, wherein the mobile communication system comprises a core network and a radio access network and the method comprises the steps of:
providing uplink multicast service data of the bidirectional multicast service from the mobile terminal utilizing established system resources configured for the bidirectional multicast service, wherein the established system resources configured for the bidirectional multicast service include a bidirectional radio bearer between a control entity for controlling radio resources in the radio access network and the mobile terminal providing downlink multicast service data of the bidirectional multicast service to the mobile terminal utilizing system resources configured for a downlink multicast service, wherein the system resources configured for the downlink multicast service include a point-to-multipoint connection in the radio access network, deciding whether to use a point-to-point connection in the radio access network for providing the downlink multicast service data to the mobile terminal instead of the established point-to-multipoint connection, and in case it has been decided to utilize the point-to-point connection, utilizing the established system resources configured for the bidirectional multicast service for providing the downlink multicast service data to the mobile terminal.

31. The method of claim 30, wherein the point-to-multipoint connection comprises a shared radio bearer between the control entity and the mobile terminal.

32. The method of claim 31, further including the step of:
in case it has been decided to utilize the point-to-point connection, releasing the system resources configured for the downlink multicast service, including the shared radio bearer.

33. The method of claim 31, wherein the system resources configured for the downlink multicast service include at least one connection between entities in the core network and the radio access network and the method further comprises the steps of:
in case it has been decided to utilize the point-to-point connection, maintaining said at least one connection and releasing the shared radio bearer, configured for the downlink multicast service.

34. The method of claim 30, wherein the downlink multicast service is activated, and the method further comprises the step of:
in case it has been decided to utilize the point-to-point connection, de-activating the downlink multicast service.

35. A method for changing system resources for providing a bidirectional multicast service from a multicast service provider to a mobile terminal within a mobile communication system, wherein the mobile communication system comprises a core network and a radio access network and the method comprises the steps of:
exchanging uplink multicast service data and downlink multicast service data of the bidirectional multicast service between the multicast service provider and the mobile terminal utilizing established system resources configured for the bidirectional multicast service, wherein the system resources configured for the bidirectional multicast service include a point-to-point connection in the radio access network, deciding whether to use a point-to-multipoint connection in the radio access network for providing the downlink multicast service data to the mobile terminal instead of the established point-to-point connection, in case it has been decided to utilize the point-to-multipoint connection, configuring system resources in the core network for a downlink multicast service for transporting the downlink multicast service data in the core network and establishing a shared radio bearer in the radio access network for providing the downlink multicast service data from a the control entity to the mobile terminal.

36. The method of claim 35, wherein the point-to-point connection includes a bidirectional radio bearer between the control entity and the mobile terminal.

37. The method of claim 35, further comprising the step of:
in case it has been decided to utilize the point-to-multipoint connection, activating the downlink multicast service for transporting the downlink multicast service data.

38. The method of claim 35, wherein in case it has been decided to utilize the point-to-multipoint connection, the configuring of the system resources in the core network for the downlink multicast service includes utilizing established system resources in the core network.

39. A method for setting up a downlink multicast service for transmitting downlink multicast service data from a downlink multicast service provider to a mobile terminal within a mobile communication system, the mobile communication system comprising a core network and a radio access network, wherein the downlink multicast service is to be used in response to a notification from a bidirectional multicast service, for providing downlink multicast service data of the bidirectional multicast service to the mobile terminal, and the method comprises the steps of:
checking whether system resources in the core network are present, said system resources being pre-configured for the bidirectional multicast service in case said system resources in the core network are present, and utilizing the pre-configured system resources in the core network for transporting the downlink multicast service data in the core network, in case said system resources in the core network are not present, configuring system resources in the core network for transporting the downlink multicast service data of the bidirectional multicast service in the core network, deciding whether to use a point-to-point connection or a point-to-multipoint connection in the radio access network for providing the downlink multicast service data to the mobile terminal, in case it has been decided to use the point-to-point connection, stopping a set-up procedure and maintaining the configured system resources in the core network, and in case it has been decided to use the point-to-multipoint connection, establishing a shared radio bearer or using an established shared radio bearer in the radio access network for providing the downlink multicast service data to the mobile terminal.

40. A method for providing a bidirectional multicast service from a multicast service provider to a mobile terminal within a mobile communication system, the mobile communication system comprising a core network and a radio access network, the method comprising the steps of:
configuring system resources for the bidirectional multicast service in the mobile communication system for the transmission of multicast service data of the bidirectional multicast service, wherein the configuring of the system resources for the bidirectional multicast service comprises the establishment of a bidirectional radio bearer between the mobile terminal and a control entity controlling radio resources of the radio access network, deciding whether to utilize a point-to-point connection or a point-to-multipoint connection in the radio access network for providing downlink multicast service data of the bidirectional multicast service to the mobile terminal, in case it has been decided to utilize the point-to-point connection, utilizing the system resources established for the bidirectional multicast service to provide the downlink multicast service data to the mobile terminal, and in case it has been decided to utilize the point-to-multipoint connection, configuring system resources for a downlink multicast service in the core network for the transmission of the downlink multicast service data of the bidirectional multicast service via the downlink multicast service, and establishing a shared radio bearer or using an established shared radio bearer in the radio access network for providing the downlink multicast service data to the mobile terminal.

41. A method for setting up a downlink multicast service, wherein the setting up is initiated by a bidirectional multicast service which transmits downlink data of the bidirectional multicast service to a downlink multicast service provider, for transmitting the downlink data of the bidirectional multicast service from the downlink multicast service provider to mobile terminals within a mobile communication system, the mobile communication system comprising a core network and a radio access network and wherein the method comprises the steps of:

receiving by the downlink multicast service from the bidirectional multicast service a notification comprising information about the mobile terminals, said mobile terminals being registered to the bidirectional multicast service and said mobile terminals destined to receive the downlink data of the bidirectional multicast service utilizing the downlink multicast service, registering the mobile terminals to the downlink multicast service, and configuring system resources in the core network for the downlink multicast service for each mobile terminal of said mobile terminals to receive the bidirectional multicast service.

42. A network entity for configuring system resources, said network entity being part of a radio access network in a mobile communication system, wherein downlink multicast service data of a bidirectional multicast service is to be provided to the mobile terminal utilizing a downlink multicast service, said network entity comprising:

a processor to configure system resources of the mobile communication system for the bidirectional multicast service for transporting multicast service data from a multicast service provider to a mobile terminal, wherein the processor configures the system resources by establishing a bidirectional radio bearer between the mobile terminal and a control entity controlling radio resources of the radio access network, wherein the processor is further configured to decide whether to utilize a point-to-point connection or a point-to-multipoint connection on the radio access network for providing downlink multicast service data of the bidirectional multicast service to the mobile terminal, a receiver to receive the downlink multicast service data, and a transmitter to forward the received downlink multicast service data through the established bidirectional radio bearer, in case it has been decided to utilize the point-to-point connection, and in case it has been decided to utilize the point-to-multipoint connection, to forward the received downlink multicast service data through an established shared radio bearer to the mobile terminal.

43. A network entity for configuring system resources, said network entity being part of a radio access network in a mobile communication system, wherein a bidirectional multicast service is to be provided to a mobile terminal and wherein downlink multicast service data of said bidirectional multicast service is to be transmitted to the mobile terminal utilizing a downlink multicast service, said network entity comprising:

a processor to configure system resources of the mobile communication system for the transmission of multicast service data of the bidirectional multicast service, wherein the processor configures the system resources by establishing a bidirectional radio bearer to the mobile terminal, a receiver to receive a notification from a network entity of a core network in the mobile communication system, including information on the mobile terminal that is provided with the bidirectional multicast service utilizing the downlink multicast service for transmitting the downlink multicast service data, wherein the processor is further configured to decide whether to utilize a point-to-point connection or a point-to-multipoint connection on the radio access network for providing the downlink multicast service data to the mobile terminal, a transmitter to transmit a notification to the network entity of the core network, the notification message comprising an identification of the mobile terminal which is to be utilizing the point-to-point connection and an identification of the bidirectional multicast service, and a receiver to receive the downlink multicast service data, wherein the transmitter is configured to forward the received downlink multicast service data through the established bidirectional radio bearer configured for the bidirectional multicast service, in case it has been decided to utilize the point-to-point connection and in case it has been decided to utilize the point-to-multipoint connection; the transmitter is configured to forward the received downlink multicast service data through an established shared radio bearer to the mobile terminal.

44. A network entity for configuring system resources, said network entity being part of a core network in a mobile communication system, wherein downlink multicast service data of a bidirectional multicast service is to be provided to the mobile terminal utilizing a downlink multicast service, said network entity comprising:

a processor to configure system resources of the mobile communication system for the transmission of multicast service data of the bidirectional multicast service from a bidirectional multicast service provider to a mobile terminal, wherein the processor configures the system resources by establishing a tunnel between the network entity and a control entity controlling radio resources of the radio access network, wherein the processor is further configured to identify the mobile terminal that is provided with the bidirectional multicast service utilizing the downlink multicast service for transmitting the downlink multicast service data, wherein the processor is further configured to inform the control entity for controlling the radio resources of the radio access network on the mobile terminal having requested the downlink multicast service and to request the control entity of the radio access network to reserve system resources for the establishment of a bidirectional radio bearer between the control entity and the mobile terminal for the transmission of the multicast service data of the bidirectional multicast service, said network entity further comprises a receiver o receive in said network entity a notification message from the control entity in the radio access network on whether it has been decided to utilize a point-to-point connection, the notification message comprising an identification of the mobile terminal to be utilizing the point-to-point connection and an identification of the bidirectional multicast service, wherein the receiver is further configured to receive downlink multicast service data, and said network entity further comprises a transmitter to forward the received downlink multicast service data through the established tunnel of the multicast service, for utilizing the established radio bearer, in case it has been decided to utilize the point-to-point connection, and in case it has been decided to utilize a point-to-multipoint connection, the transmitter is further configured to transmit a notification to a downlink multicast service provider for soft-de-activating the downlink multicast service.

45. The network entity of claim 44, wherein the processor is further configured to perform the steps of a method for providing a bidirectional multicast service from a bidirectional multicast service provider to a mobile terminal within a mobile communication system, the mobile communication system comprising a core network and a radio access network, the method comprising the steps of:

configuring system resources for the bidirectional multicast service in the mobile communication system for the transmission of multicast service data of the bidirectional multicast service, wherein the configuring comprises the establishment of a bidirectional radio bearer between the mobile terminal and a control entity controlling radio resources of the radio access network, configuring system resources for a downlink multicast service in the core network for the transmission of downlink multicast service data of the bidirectional multicast service via the downlink multicast service, deciding whether to utilize a point-to-point connection or a point-to-multipoint connection in the radio access network for providing the downlink multicast service data of the bidirectional multicast service to the mobile terminal, in case it has been decided to utilize the point-to-point connection, utilizing the system resources established for the bidirectional multicast service to provide the downlink multicast service data to the mobile terminal, and in case it has been decided to utilize the point-to-multipoint connection, utilizing the system resources of the core network established for the downlink multicast service for transport of the downlink multicast service data in the core network and establishing a shared radio bearer or using an established shared radio bearer in the radio access network for providing the downlink multicast service data to the mobile terminal, wherein the configuring of the system resources for the bidirectional multicast service further includes the establishment of a connection between a network entity in the core network and the control entity in the radio access network and in case it has been decided to utilize the point-to-point connection, further utilizing said connection between the network entity in the core network and the control entity in the radio access network for the transmission of the downlink multicast service data.

46. A mobile communication system for setting up a bidirectional multicast service from a multicast service provider to a mobile terminal, further comprising at least a network entity according to claim 44.

47. A mobile terminal within a mobile communication system for participating in a bidirectional multicast service provided by a bidirectional multicast service provider, wherein in the mobile communication system downlink multicast service data of said bidirectional multicast service is to be provided to the mobile terminal utilizing a downlink multicast service, the mobile terminal comprising:

a processor configured to configure system resources in the mobile communication system, including a bidirectional radio bearer to a control entity in the radio access network for the transmission and reception of service data of the bidirectional multicast service, wherein the processor is further configured to configure system resources in the mobile communication system for the reception of the downlink multicast service data through the downlink multicast service, and wherein the mobile terminal further comprises a receiver configured to receive downlink multicast service data through the established bidirectional radio bearer, in case a point-to-point connection is decided in the radio access network and in case a point-to-multipoint connection is decided, the receiver is configured to receive the downlink multicast service data through an established shared radio bearer.

* * * * *